(12) United States Patent
Tamada et al.

(10) Patent No.: US 12,488,248 B2
(45) Date of Patent: Dec. 2, 2025

(54) DEEP NEURAL NETWORK COMPRESSION BASED ON FILTER IMPORTANCE

(71) Applicant: GE Precision Healthcare LLC, Milwaukee, WI (US)

(72) Inventors: Rajesh Kumar Tamada, Bengaluru (IN); Junpyo Hong, San Ramon, CA (US); Attila Márk Rádics, Nagykovácsi (HU); Hans Krupakar, San Ramon, CA (US); Venkata Ratnam Saripalli, Danville, CA (US); Dibyajyoti Pati, Dublin, CA (US); Guarav Kumar, Bokaro Steel (IN)

(73) Assignee: GE Precision Healthcare LLC, Waukesha, WI (US)

( * ) Notice: Subject to any disclaimer, the term of this patent is extended or adjusted under 35 U.S.C. 154(b) by 1003 days.

(21) Appl. No.: 17/174,049

(22) Filed: Feb. 11, 2021

(65) Prior Publication Data

US 2022/0253708 A1 Aug. 11, 2022

(51) Int. Cl.
*G06N 3/082* (2023.01)
*G06F 18/2115* (2023.01)
(Continued)

(52) U.S. Cl.
CPC ......... *G06N 3/082* (2013.01); *G06F 18/2115* (2023.01); *G06F 18/214* (2023.01); *G06N 3/063* (2013.01); *G06N 5/04* (2013.01)

(58) Field of Classification Search
CPC .......... G06N 3/082; G06N 3/063; G06N 5/04; G06F 18/2115; G06F 18/214
See application file for complete search history.

(56) References Cited

U.S. PATENT DOCUMENTS

2019/0050715 A1* 2/2019 Ooi ................. G06N 3/063

FOREIGN PATENT DOCUMENTS

CN 106599883 A * 4/2017
WO WO-2020033898 A1 * 2/2020 ......... G06K 9/00711

OTHER PUBLICATIONS

Z. Liu, Z. Chen and W. Li, "Importance-Aware Filter Selection for Convolutional Neural Network Acceleration," 2019 IEEE Visual Communications and Image Processing (VCIP), Sydney, NSW, Australia, 2019, pp. 1-4 (Year: 2019).*

(Continued)

*Primary Examiner* — Kamran Afshar
*Assistant Examiner* — Simon Fischer Ellis
(74) *Attorney, Agent, or Firm* — Amin, Turocy & Watson, LLP

(57) ABSTRACT

Techniques are provided for compressing deep neural networks using a structured filter pruning method that is extensible and effective. According to an embodiment, a computer-implemented method comprises determining, by a system operatively coupled to a processor, importance scores for filters of layers of a neural network model previously trained until convergence for an inferencing task on a training dataset. The method further comprises removing, by the system, a subset of the filters from one or more layers of the layers based on the importance scores associated with the subset failing to satisfy a threshold importance score value. The method further comprises converting, by the system, the neural network model into a compressed neural network model with the subset of the filters removed.

28 Claims, 12 Drawing Sheets

(51) Int. Cl.
*G06F 18/214* (2023.01)
*G06N 3/063* (2023.01)
*G06N 5/04* (2023.01)

(56) References Cited

OTHER PUBLICATIONS

Li, Hao, Asim Kadav, Igor Durdanovic, Hanan Samet, and Hans Peter Graf. "Pruning filters for efficient convnets." arXiv preprint arXiv:1608.08710 (2016). (Year: 2016).*

Jingjing Cao, Sam Kwong, Ran Wang, Xiaodong Li, Ke Li, Xiangfei Kong, Class-specific soft voting based multiple extreme learning machines ensemble, Neurocomputing, vol. 149, Part A, (Year: 2015).*

A. Salama, O. Ostapenko, T. Klein and M. Nabi, "Prune Your Neurons Blindly: Neural Network Compression through Structured Class-blind Pruning," ICASSP 2019—2019 IEEE International Conference on Acoustics, Speech and Signal Processing (ICASSP), Brighton, UK, 2019, pp. 2802-2806 (Year: 2019).*

Xu, Xiaowei, Qing Lu, Lin Yang, Sharon Hu, Danny Chen, Yu Hu, and Yiyu Shi. "Quantization of fully convolutional networks for accurate biomedical image segmentation." In Proceedings of the IEEE conference on computer vision and pattern recognition, pp. 8300-8308.2018. (Year: 2018).*

Frankle, et al., "The Lottery Ticket Hypothesis: Finding Sparse, Trainable Neural Networks," arXiv:1803.03635v5 [cs.LG] Mar. 4, 2019, https://arxiv.org/abs/1803.03635, 42 pages.

Ding, et al., "Global Sparse Momentum SGD for Pruning VeryDeep Neural Networks," arXiv:1909.12778v3 [cs.LG] Oct. 25, 2019, https://arxiv.org/pdf/1909.12778.pdf, 13 pages.

github.com, "he-y / Awesome-Pruning," https://github.com/he-y/Awesome-Pruning, 10 pages.

Li, et al., "PENNI: Pruned Kernel Sharing for Efficient CNN Inference," arXiv:2005.07133v2 [cs.CV] Jun. 25, 2020, https://arxiv.org/pdf/2005.07133.pdf, 15 pages.

Wang, et al., "Accelerate Your CNN from Three Dimensions: A Comprehensive Pruning Framework," arXiv:2010.04879v1 [cs.CV] Oct. 10, 2020, https://arxiv.org/pdf/2010.04879v1.pdf, 8 pages.

Su, et al., "Sanity-Checking Pruning Methods: Random Tickets can Win the Jackpot," arXiv:2009.11094v1 [cs.LG] Sep. 22, 2020, https://arxiv.org/pdf/2009.11094v1.pdf, 14 pages.

Wang, et al., "Achieving Adversarial Robustness via Sparsity," arXiv:2009.05423v1 [cs.LG] Sep. 11, 2020, https://arxiv.org/pdf/2009.05423v1.pdf, 9 pages.

Paganini, "Prune Responsibly," arXiv:2009.09936v1 [cs.CV] Sep. 10, 2020, https://arxiv.org/pdf/2009.09936v1.pdf, 18 pages.

Wang, et al., "SparseRT: Accelerating Unstructured Sparsity on GPUs for DeepLearning Inference," arXiv:2008.11849v1 [cs.LG] Aug. 26, 2020, https://arxiv.org/pdf/2008.11849v1.pdf, 12 pages.

Rastegari, et al., "XNOR-Net: ImageNet Classification Using Binary Convolutional Neural Networks," arXiv:1603.05279v4 [cs.CV] Aug. 2, 2016, https://arxiv.org/abs/1603.05279, 17 pages.

Zhou, et al., "Incremental Network Quantization: Towards Lossless CNNs with Low-Precision Weights," arXiv:1702.03044v2 [cs.CV] Aug. 25, 2017, https://arxiv.org/abs/1702.03044, 14 pages.

Zhuang, et al., "Towards Effective Low-bitwidth Convolutional Neural Networks," arXiv:1711.00205v2 [cs.CV] Nov. 17, 2017, https://arxiv.org/abs/1711.00205, 11 pages.

Guo, et al., "Dynamic Network Surgery for Efficient DNNs," arXiv:1608.04493v2 [cs.NE] Nov. 10, 2016, https://arxiv.org/abs/1608.04493, 9 pages.

Han, et al., "Deep Compression: Compressing Deep Neural Networks with Pruning, Trained Quantization and Huffman Coding," arXiv:1510.00149v5 [cs.CV] Feb. 15, 2016, https://arxiv.org/abs/1510.00149?source=post_page—, 5 pages.

Alvarez, et al., "Learning the Number of Neurons in Deep Networks," arXiv:1611.06321v3 [cs.CV] Oct. 11, 2018, https://arxiv.org/abs/1611.06321, 9 pages.

Denton, et al., "Exploiting Linear Structure Within Convolutional Networks for Efficient Evaluation," arXiv:1404.0736v2 [cs.CV] Jun. 9, 2014, https://arxiv.org/abs/1404.0736, 11 pages.

Le Cun, et al., "Optimal brain damage," Advances in neural information processing systems, published Jan. 1, 1989, 8 pages.

Hassibi, et al., "Second order derivatives for network pruning: Optimal Brain Surgeon," Part of Advances in Neural Information Processing Systems 5 (NIPS 1992), 8 pages.

Li, et al., "Pruning Filters for Efficient ConvNets," arXiv:1608.08710v3 [cs.CV] Mar. 10, 2017, https://arxiv.org/abs/1608.08710, 13 pages.

Molchanov, et al., "Pruning Convolutional Neural Networks for Resource Efficient Inference," harXiv:1611.06440v2 [cs.LG] Jun. 8, 2017, ttps://arxiv.org/abs/1611.06440, 17 pages.

Krizhevsky, "The CIFAR-10 dataset," 2009, 4 pages.

nih.gov, "Montgomery County—Chest X-ray Database," openi.nlm.nih.gov/imgs/collections/NLM-MontgomeryCXRSet.zip, 2 pages, Retrieved from the Internet: Dec. 10, 2020.

Kingma, et al., "Adam: A Method for Stochastic Optimization," arXiv:1412.6980v9 [cs.LG] Jan. 30, 2017, https://arxiv.org/abs/1412.6980, 15 pages.

Ronneberger, et al., U-Net: Convolutional Networks for Biomedical Image Segmentation, arXiv:1505.04597v1 [cs.CV] May 18, 2015, https://arxiv.org/abs/1505.04597, 8 pages.

Simonyan, et al., "Very Deep Convolutional Networks for Large-Scale Image Recognition," arXiv:1409.1556v6 [cs.CV] Apr. 10, 2015, https://arxiv.org/abs/1409.1556, 14 pages.

He, et al., "Deep Residual Learning for Image Recognition," harXiv:1512.03385v1 [cs.CV] Dec. 10, 2015, https://arxiv.org/abs/1512.03385, 12 pages.

Park, et al., "Lookahead: A Far-sighted Alternative of Magnitude-based Pruning," Under review as a conference paper at ICLR 2020, Retrieved from the Internet: Dec. 10, 2020, https://openreview.net/attachment?d=ryl3ygHYDB&name=original_pdf, 12 pages.

Li, et al., "PENNI: Pruned Kernel Sharing for Efficient CNN Inference," arXiv:2005.07133v2 [cs.CV] Jun. 25, 202, https://arxiv.org/abs/2005.07133, 15 pages.

Nachar, "The Mann-Whitney U: A Test for Assessing Whether Two Independent Samples Come from the Same Distribution," Tutorials in Quantitative Methods for Psychology 2008, vol. 4(1), p. 13-20.

cs.toronto.edu, "The CIFAR-10 dataset," Alex Krizhevsky, 2009, https://www.cs.toronto.edu/%7Ekriz/cifar.html, 4 pages.

openi.nlm.nih.gov, "Montgomery County Chest X-ray Database," openi.nlm.nih.gov/imgs/collections/NLM-MontgomeryCXRSet.zip, 2 pages.

Bellec, et al., "Deep Rewiring: Training very sparse deep networks," arXiv:1711.05136v5 [cs.NE] Aug. 7, 2018, https://arxiv.org/pdf/1711.05136.pdf, 24 pages.

Dai, et al., "Compressing Neural Networks using the Variational Information Bottleneck," arXiv:1802.10399v3 [cs.CV] Apr. 19, 2018, https://arxiv.org/pdf/1802.10399.pdf, 27 pages.

Deng, et al., "ImageNet: a Large-Scale Hierarchical Image Database," Conference: 2009 IEEE Computer Society Conference on Computer Vision and Pattern Recognition (CVPR 2009), Jun. 20-25, 2009, Miami, Florida, USA, https://www.researchgate.net/publication/221361415_ImageNet_a_Large-Scale_Hierarchical_Image_Database/link/00b495388120dbc339000000/download, 9 pages.

Ding, et al., "Centripetal SGD for Pruning Very Deep Convolutional Networks with Complicated Structure," arXiv:1904.03837v1 [cs.LG] Apr. 8, 2019, https://arxiv.org/pdf/1904.03837.pdf, 11 pages.

Ding, et al., "Global Sparse Momentum SGD for Pruning Very Deep Neural Networks," rXiv:1909.12778v3 [cs.LG] Oct. 25, 2019 ,https://arxiv.org/pdf/1909.12778.pdf, 13 pages.

Frankle, et al., "The Lottery Ticket Hypothesis: Finding Sparse, Trainable Neural Networks," arXiv:1803.03635v5 [cs.LG] Mar. 4, 2019, https://arxiv.org/pdf/1803.03635.pdf, 42 pages.

Hassibi, et al., "Second order derivatives for network pruning: Optimal brain surgeon," Advances in Neural Information Processing Systems 5 (NIPS 1992), https://authors.library.caltech.edu/54983/3/647-second-order-derivatives-for-network-pruning-optimal-brain-surgeon(1).pdf, 8 pages.

(56) References Cited

OTHER PUBLICATIONS

He, et al., "Deep Residual Learning for Image Recognition," arXiv:1512.03385v1 [cs.CV] Dec. 10, 2015, https://arxiv.org/pdf/1512.03385.pdf, 12 pages.

He, et al., "AMC: AutoML for Model Compression and Acceleration on Mobile Devices," arXiv:1802.03494v4 [cs.CV] Jan. 16, 2019, https://arxiv.org/pdf/1802.03494.pdf, 17 pages.

Kingma, et al., "Adam: A Method for Stochastic Optimization," rXiv:1412.6980v9 [cs.LG] Jan. 30, 2017, https://arxiv.org/pdf/1412.6980.pdf, 15 pages.

Lecun, et al., "Optimal Brain Damage," Conference: Advances in Neural Information Processing Systems 2, [NIPS Conference, Denver, Colorado, USA, Nov. 27-30, 1989], https://www.researchgate.net/publication/221618539_Optimal_Brain_Damage/link/0a85e538d2fee9caa3000000/download, 9 pages.

Lin, et al., "Runtime Neural Pruning," 31st Conference on Neural Information Processing Systems (NIPS 2017), Long Beach, CA, USA, https://dl.acm.org/doi/pdf/10.5555/3294771.3294979, 11 pages.

Liu, et al., "Learning Efficient Convolutional Networks through Network Slimming," arXiv:1708.06519v1 [cs.CV] Aug. 22, 2017, https://arxiv.org/pdf/1708.06519.pdf, 10 pages.

Louizos, et al., "Bayesian Compression for Deep Learning," arXiv:1705.08665v4 [stat.ML] Nov. 6, 2017, https://arxiv.org/pdf/1705.08665.pdf, 17 pages.

Louizos, et al., "Learning Sparse Neural Networks through L0 Regularization," arXiv:1712.01312v2 [stat.ML] Jun. 22, 2018, https://arxiv.org/pdf/1712.01312.pdf 13 pages.

Molchanov, et al., "Variational Dropout Sparsifies Deep Neural Networks," aarXiv:1701.05369v3 [stat.ML] Jun. 13, 2017, https://arxiv.org/pdf/1701.05369.pdf, 10 pages.

Neal, "Bayesian learning for neural networks," vol. 118. Springer Science & Business Media, 2012, https://citeseerx.ist.psu.edu/viewdoc/download?doi=10.1.1.446.9306&rep=rep1&type=pdf, 195 pages.

Park, et al., "Lookahead: A Far-Sightedalternative Ofmagnitude-Basedpruning," Published as a conference paper at ICLR Apr. 26, 2020, https://openreview.net/pdf?id=ryl3ygHYDB, 20 pages.

Ronnebeger et al., "U-Net: Convolutional Networks for Biomedical Image Segmentation," arXiv:1505.04597v1 [cs.CV] May 18, 2015, https://arxiv.org/pdf/1505.04597.pdf, 8 pages.

Wang, "Pruning Convolutional Filters with First OrderTaylor Series Ranking," ABCs, 2018, http://users.cecs.anu.edu.au/~Tom.Gedeon/conf/ABCs2018/paper/ABCs2018_paper_53.pdf, 7 pages.

Wen, "Learning Structured Sparsity in Deep Neural Networks," arXiv:1608.03665v4 [cs.NE] Oct. 18, 2016, https://arxiv.org/pdf/1608.03665.pdf, 10 pages.

Zhang, et al., "Learning to Share: Simultaneous Parameter Tying and Sparsification in Deep Learning," Published as a conference paper at ICLR 2018, https://openreview.net/pdf?id=rypT3fb0b, 14 pages.

Wilcoxon et al., "Critical Values and Probability Levels for the Wilcoxon Rank Sum Test and the Wilcoxon Signed Rank Test," Selected Tables in Mathematical Statistics, vol. 1, 1970, pp. 171-259.

\* cited by examiner

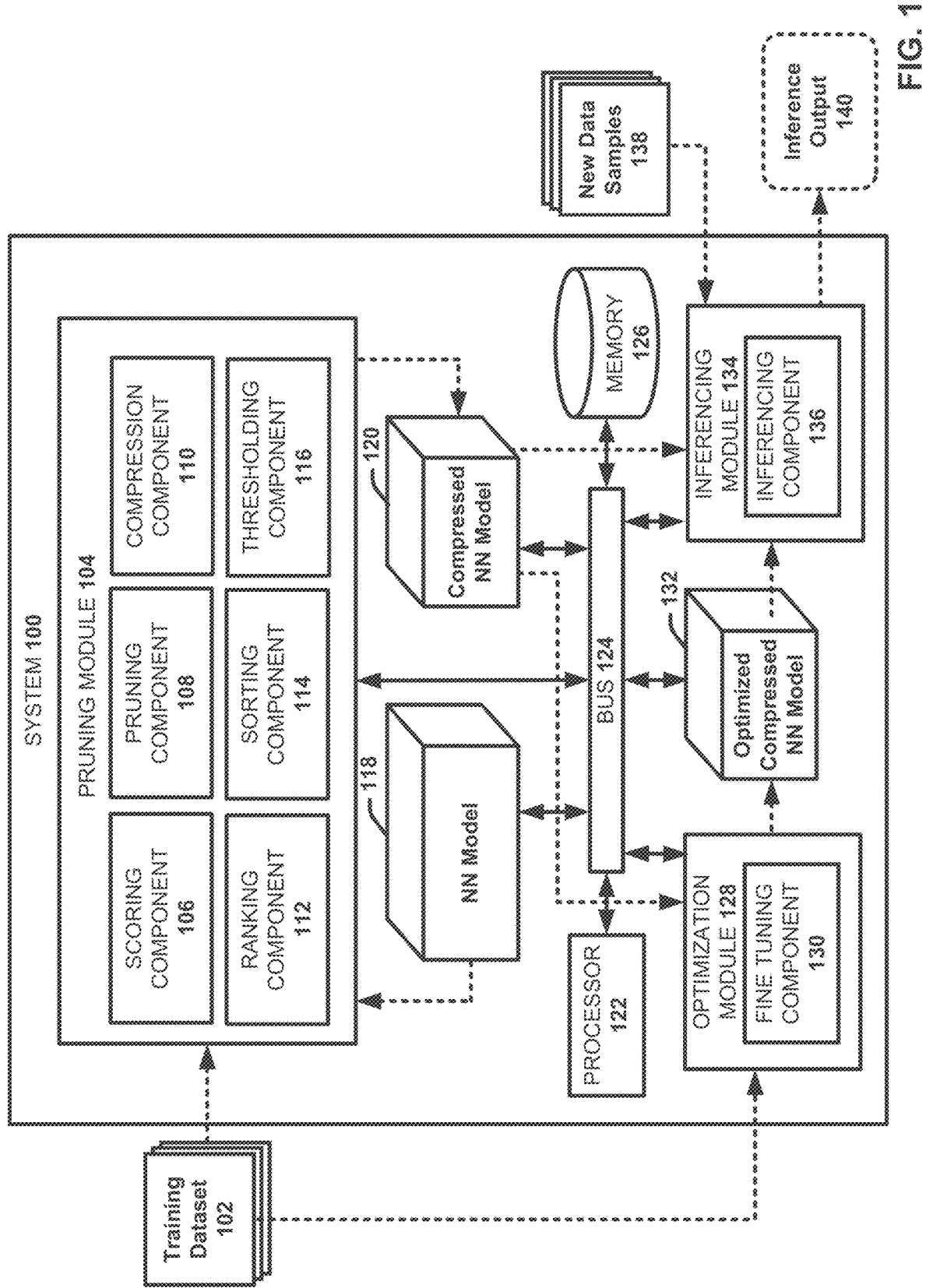

Algorithm 1 Filter Importance Calculation

Ensure: Model has converged
1: $imp_w \leftarrow [0 \ldots 0]$
2: $weights \leftarrow model.weights$
3: for $batch \in training\ data$ do
4:     $gradients \leftarrow model(batch).loss.gradient$
5:     $imp_w \leftarrow imp_w + gradients^2$
6: end for
7: $imp_f \leftarrow [0 \ldots 0]$
8: for $filter \in model\ filters$ do
9:     $imp_f[filter] \leftarrow \sum_{weight \in filter} imp_w[weight]$
10: end for
11: for $filter \in model\ filters$ do
12:     $imp_f[filter] \leftarrow \frac{imp_f[filter]}{count\ of\ weights\ in\ filter}$
13: end for

FIG. 2

Table 701. Hyper-Parameters

| Hyper-Parameters | VGG19 | ResNet-18 | UNet |
|---|---|---|---|
| Image Dimension | 32x32 | 32x32 | 512x512 |
| Optimizer | Adam | Adam | Adam |
| Initial Learning Rate | 4e-3 | 1e-2 | 1e-4 |
| Batch size | 256 | 256 | 2 |
| Epochs | 200 | 200 | 100 |

Table 702. Model Comparison

| Model | Param. Count | Test Acc. |
|---|---|---|
| VGG19 (GS) | 38,947,914 | 89.02% |
| VGG19 (LAP) | 20,030,000 | 90.98% |
| ResNet-18 (GS) | 11,183,562 | 92.70% |
| ResNet-18 (LAP) | 10,990,000 | 91.32% |

FIG. 7

DEEP NEURAL NETWORK COMPRESSION BASED ON FILTER IMPORTANCE

TECHNICAL FIELD

This application generally relates to deep learning and more particularly to computer-implemented techniques for compressing deep neural networks.

BACKGROUND

In recent years deep neural networks (DNNs) have achieved state-of-the-art performance in various computer vision tasks, such as image classification, segmentation, and object detection. In particular, convolutional neural networks (CNNs) have even been shown to achieve better than human performance at image classification on the popular ImageNet dataset. Such success has been made possible through a combination of large-scale datasets and advancements in computing hardware technologies which together allow researchers to design and train deeper and more complex DNNs.

Modern CNNs, however, have been shown to be heavily over-parameterized. This makes it challenging to deploy them on resource constrained platforms, such as medical imaging devices, mobile phones, and similar devices, since inferencing with tens of millions of parameters can be slow and such models may not even fit within the limited memory available on a given device.

Network pruning has been one popular approach to address this problem. Through pruning, a smaller sub-network is derived from a larger base model by removing redundant weights. Over the years there have been several papers demonstrating the efficacy of various pruning methods. However, existing pruning methods either suffer from a high degree of complexity (leading to slower training), or else fail to improve inferencing speed.

SUMMARY

The following presents a summary to provide a basic understanding of one or more embodiments of the invention. This summary is not intended to identify key or critical elements or to delineate any scope of the particular embodiments or any scope of the claims. Its sole purpose is to present concepts in a simplified form as a prelude to the more detailed description that is presented later. In one or more embodiments described herein, systems, computer-implemented methods, apparatus and/or computer program products that facilitate compressing DNNs using a structured filter pruning method that is extensible and effective.

According to an embodiment, a computer-implemented method for performance by a system operatively coupled to a processor is provided. The method comprises determining, by the system, importance scores for filters of layers of a neural network model previously trained until convergence for an inferencing task on a training dataset. The method further comprises removing, by the system, a subset of the filters from one or more layers of the layers based on the importance scores associated with the subset failing to satisfy a threshold importance score value. The method further comprises converting, by the system, the neural network model into a compressed neural network model with the subset of the filters removed.

In various embodiments, the importance scores are determined by passing the training dataset through the layers of the neural network model and determining sensitivity gradients of weights of the filters to data points in the training dataset. The importance scores of each of the filters are determined independently without considering their impact on other layers. In some implementations, the method further comprises ranking, by the system, the filters within each layer of the layers relative to one another as a function of their importance scores.

In one or more embodiments, the layers comprise at least one convolutional layer that precedes at least one batch normalization layer. In some implementations of these embodiments, based on the subset of filters including a first filter included in the at least one convolutional layer, the method further comprises removing, by the system, a second filter included in the at least one batch normalization layer that corresponds to the first filter. Additionally, or alternatively, the filters comprise residual connection filters shared between two or more layers, and wherein the removing comprises applying an exception for removing the residual connection filters regardless of whether their importance scores fail to satisfy the threshold importance score value.

In some embodiments, the method can further comprise normalizing, by the system, the importance scores of the filters within each layer of the layers, resulting in normalized importance scores for the filters within each layer, and determining cumulative sums of the normalized importance scores for each layer. The method can further comprise sorting, by the system, the layers as a function of the cumulative sums associated with each layer, and determining, by the system, the threshold importance score value based on a measure of contribution of the normalized importance scores to the cumulative sums associated with each layer.

In some embodiments, the method can further comprise that applying, by the system (or another system) the compressed neural network model to a new dataset to perform the inferencing task and generate an inference output. Additionally, or alternatively, the method can include re-training, by the system, the compressed neural network using the training dataset, resulting in an optimized compressed neural network, and applying the optimized compressed neural network model to the new dataset to perform the inferencing task and generate the inference output. In various embodiments, the inferencing task comprises and image segmentation task or an image classification task. For example, the image segmentation task can include a medical image segmentation task (e.g., organ segmentation, region of interest segmentation, etc.). In another example, the image classification task can include a medical image classification task (e.g., a diagnostic classification).

In accordance with the disclosed embodiments, the compressed neural network model has a smaller memory footprint and higher inferencing speed relative to the neural network model prior to compression. The compressed neural network model and/or the optimized compressed neural network model also has less than or equal to a 15% accuracy performance degradation relative to the neural network model.

In some embodiments, elements described in connection with the disclosed computer-implemented methods can be embodied in different forms such as a computer system, a computer program product, or another form.

DESCRIPTION OF THE DRAWINGS

FIG. 1 illustrates a block diagram of an example, non-limiting system that facilitates compressing DNNs in accordance with one or more embodiments of the disclosed subject matter.

FIG. 2 presents an example algorithm for calculating filter importance scores in accordance with one or more embodiments of the disclosed subject matter.

FIG. 7 presents tables comprising experimental results data associated with testing efficacy of compressed DNNs generated using the disclosed methods.

DETAILED DESCRIPTION

Figure 3:
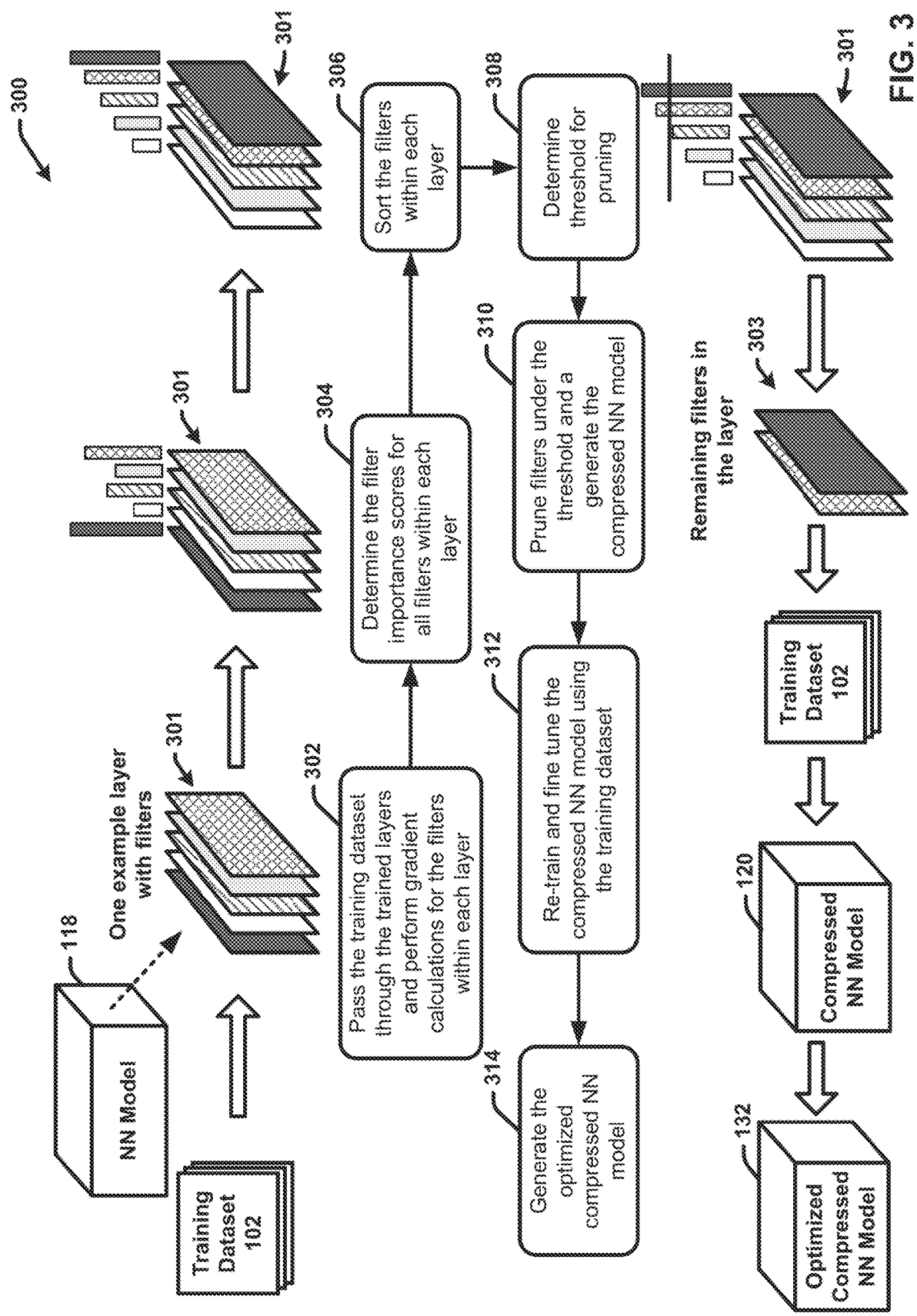
FIG. 3 illustrates a flow-diagram of an example, non-limiting method for compressing DNNs based on filter importance in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure provides systems, computer-implemented methods, apparatus and/or computer program products that facilitate pruning DNNs in an extensible and effective manner. There are two categories of pruning methods: structured and unstructured. Unstructured pruning methods focus on removing the connections between neurons (also referred to herein as nodes or filters) in a network by removing their weights. These methods produce sparse sub-networks, but usually require specialized hardware and software to take full advantage of this sparsity. On the other hand, structured pruning methods produce a compact sub-network by pruning entire filters or layers. This enhances inferencing speed and reduces memory footprint without imposing any additional hardware requirements.

The disclosed subject matter provides a novel, structured filter pruning method that runs with minimal overhead and results in models with small memory footprints and enhanced inferencing speeds with equivalent or better final model performance. In addition, being structured, this pruning method runs with little overhead and generates a compressed model that can be executed without specialized hardware or software, thus making the resulting compressed model executable out of the box by essentially any computing device, including those with memory and processor constraints (e.g., medical imaging devices, mobile phones, and similar devices). This method, termed "Grad Square" (GS), determines which filters to prune from a neural network by using a gradient-based scoring scheme that involves analyzing the filter's squared gradients during weight updates. Unlike other pruning methods, GS scores each filter independently, without considering its impact on other layers. This enables streamlined and rapid computation of filter importance without significantly compromising the final performance of the compressed model.

Grad Square compares favorably against other compression techniques across various model architectures and imaging tasks. Grad Square can also account for residual connections, which have become a ubiquitous network architecture pattern, but which can cause problems for some pruning techniques. The efficacy of the disclosed GS technique was tested in association with compressing both image classification and image segmentation DNNs. These experiments demonstrate that GS produces competitive results compared to other state-of-the-art pruning methods that are significantly more computationally complex.

While various embodiments of the disclosed techniques are demonstrated in association with image segmentation and image classification DNNs, these techniques can be suitably adapted to prune networks that perform other types of image-based inferencing tasks and non-image based inferencing tasks.

The term "image processing model" is used herein to refer to an AI/ML model configured to perform an image processing or analysis task on images. The image processing or analysis task can vary. In various embodiments, the image processing or analysis task can include, (but is not limited to): a segmentation task, a classification task, an image reconstruction task, an image denoising task, an image registration task, an image translation task, an image super resolution task, an image coloring task, an object recognition task, a motion detection task, a video tracking task, an optical flow task, and the like. The image processing models described herein can include 2D image processing models as well as three-dimensional (3D) image processing models. The image processing model can employ various types of neural network models, including (but not limited to): deep learning models, DNNs, CNNs, and the like.

The term "image-based inference output" is used herein to refer to the determination or prediction that an image processing model is configured to generate. For example, the image-based inference output can include a segmentation mask, a reconstructed image, an adapted image, an annotated image, a classification, a value, or the like. The image-based inference output can vary based on the type of the model and the particular task that the model is configured to perform. The image-based inference output can include a data object that can be rendered (e.g., a visual data object), stored, used as input for another processing task, or the like. The terms "image-based inference output", "inference output" "inference result", "inference", "output", "predication", and the like, are used herein interchangeably unless context warrants particular distinction amongst the terms.

As used herein, a "medical imaging processing model" refers to an image processing model that is tailored to perform an image processing/analysis task on one or more medical images. For example, the medical imaging processing/analysis task can include (but is not limited to): organ segmentation, anomaly detection, anatomical feature characterization, medical image reconstruction, diagnosis, and the like. The types of medical images processed/analyzed by the medical image processing model can include images captured using various types of imaging modalities. For example, the medical images can include (but are not limited to): radiation therapy (RT) images, X-ray images, digital radiography (DX) X-ray images, X-ray angiography (XA) images, panoramic X-ray (PX) images, computerized tomography (CT) images, mammography (MG) images (including a tomosynthesis device), a magnetic resonance imaging (MRI) images, ultrasound (US) images, color flow doppler (CD) images, position emission tomography (PET) images, single-photon emissions computed tomography (SPECT) images, nuclear medicine (NM) images, and the like. The medical images can include two-dimensional (2D) images as well as three-dimensional images (3D).

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Turning now to the drawings, FIG. 1 illustrates a block diagram of an example, non-limiting system 100 that facilitates compressing DNNs in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a pruning module 104, an optimization module 128 and an inferencing module 134, which can respectively be and include machine-executable components. In the embodiment shown, the pruning module 104 includes scoring component 106, pruning component 108, compression component 110, ranking component 112, sorting component 114, and thresholding component 116 which can respectively be machine-executable components. System 100 further includes a neural network (NN) model 118, a compressed NN model 120 and an optimized compressed NN model 132. These models can also be or correspond to computer-executable components and/or instructions. As discussed in greater detail below, the pruning module 104 can compress the NN model 118 to generate the compressed NN model 120, and the optimization module 128 can fine-tune the compressed NN model 120 to generate the optimized compressed NN model 132. The inferencing module 134 can further apply the compressed NN model 120 and/or the optimized compressed NN model 132 to one or more new data samples 138 to generate an inference output with faster processing speed relative to the NN model 118.

System 100 can also include or be operatively coupled to at least one memory 126 that can store the machine-executable components of system 100 (e.g., the pruning module 104, the optimization module 128, the inferencing module 134, the NN model 118, the compressed NN model 120, and/or the optimized compressed NN model 132). The at least one memory 126 can further be operatively coupled to at least one processor 122 such that the components stored therein can be executed by the at least one processor to perform the operations described. System 100 also includes a system bus 124 that operatively couples the various modules and components of the system (e.g., the pruning module 104, the optimization module 128, the inferencing module 134, the NN model 118, the compressed NN model 120, and/or the optimized compressed NN model 132). Examples of said and memory and processor as well as other suitable computer or computing-based elements, can be found with reference to FIG. 12, and can be used in connection with implementing one or more of the systems or components shown and described in connection with FIG. 1 or other figures disclosed herein.

It should be appreciated that the embodiments of the subject disclosure depicted in various figures disclosed herein are for illustration only, and as such, the architecture of such embodiments are not limited to the systems, devices, and/or components depicted therein. In some embodiments, the components of system 100 can be executed on a single computing device (e.g., system 100 can be or correspond to a single computing device). Additionally, or alternatively, one or more of the components of system 100 can be executed by different computing devices (e.g., including virtual machines) separately or in parallel in accordance with a distributed computing system architecture. For example, in various embodiments, the inferencing module 134 and the compressed NN model 120 and/or the optimized compressed NN model 132 can be stored in memory of a different device (e.g., a resource constrained device, such as a medical imaging device, a mobile phone, etc.) and executed thereby. System 100 can also comprise various additional computer and/or computing-based elements described herein with reference to operating environment 1200 and FIG. 12. In several embodiments, such computer and/or computing-based elements can be used in connection with implementing one or more of the modules, components, and/or computer-implemented operations shown and described in connection with FIG. 1 or other figures disclosed herein.

The pruning module 104 can perform the disclosed GS pruning method to compress a NN model (e.g., NN model 118) into a compressed NN model (e.g., compressed NN model 120) with a smaller memory footprint and an enhanced inferencing speed relative to the NN model with equivalent or better final model performance. In this regard, given a base model trained on a training dataset 102 until convergence for a particular task (e.g., NN model 118), the GS pruning method involves computing a filter importance score for each (or in some implementations one or more) filter of each (e.g., or in some implementations one or more) layer of the model. Based on these scores, the 'less important' filters are removed from the NN model 118. To facilitate this end, the pruning module 104 can include scoring component 106, pruning component 108, compression component 110, ranking component 112, sorting component 114 and thresholding component 116.

In this regard, the NN model 118 corresponds to a previously trained NN model trained on training dataset 102 until convergence to perform an inferencing task. The type of the NN model 118 and the inferencing task can vary. In various embodiments the NN model 118 can be or correspond to a DNN. In some embodiments, the NN model 118 can have a CNN architecture. Other suitable deep learning architectures for the NN models 118 can include but are not limited to, recurrent neural networks, recursive neural networks, and classical neural networks. In some embodiments, the NN model 118 can include a batch normalization (BN) architecture pattern with one or more BN layers. Additionally, or alternatively, the NN model 118 can include a residual connection architecture pattern. In one or more embodiments, the NN model 118 can be an image processing model, such as an image segmentation model or an image classification model. In accordance with theses embodiments, the training dataset 102 can include images and the NN model 118 can be configured to perform an image processing task (e.g., image segmentation, image classification, etc.). For example, in some embodiments, the NN model 118 can be or correspond to a medical image processing model and the training dataset 102 can include medical images.

With reference to the pruning module 104, the scoring component 106 can determine importance scores for filters of layers of the NN model 118. The importance scores represent the relative importance of each filter within a layer compared to other filters in the same lay with respect to contributing to the accuracy of the model inference output. In some embodiments, the layers for which the filter scores are determined can be restricted to convolution layers of the NN model 118. In other embodiments, the layers can include batch BN layers, parametric rectifier linear unit (PReLu) layers, residual connection layers, and other types of NN model layers.

In accordance with the GS method, the scoring component 106 employs a gradient-based scoring mechanism to determine the importance scores for the filters independently without considering their impact on other layers. The gradient-based scoring mechanism involves determining squared sensitivity gradients of weights of the filters to datapoints in the training dataset 102. To accomplish this task, the scoring component 106 passes the training dataset 102 through the layers of the neural NN model 118 and determines the sensitivity gradients of weights of the filters to the data points in the training dataset 102 with respect to loss in model performance accuracy. During this scoring processes, the weights are not adjusted. In this regard, the scoring component determines how sensitive the existing model filter weights are with respect to loss in model performance. The scoring component 106 determines the importance scores for the respective filters in each layer based on the cumulative sum of sensitivity gradients determined for each filter to the different datapoints.

This gradient-based scoring mechanism is based on a first-order Taylor series expansion of model loss with respect to model weights and is used by the scoring component 106 to compute the relative usefulness of any given filter within a layer. This Taylor expansion is given in Equation 1 below, where L(w) is the loss function parameterized by the weight matrix w of the neural network and wherein L is assumed to be continuous and differentiable in the interval [w−Δw, w]). For a model with N weights, Δw is a vector of small weight updates [Δω$_1$, ..., Δω$_N$].

$$L(w-\Delta w)=L(w)-\nabla L(w)\Delta w+\tfrac{1}{2}\nabla^2 L(w)\Delta w^2+\ldots \quad \text{Equation 1.}$$

Ignoring the higher order terms, Equation 1 can be rearranged into Equation 2 below.

$$L(w-\Delta w)-L(w))\approx-\nabla L(w)\Delta w$$

$$|L(w-\Delta w)-L(w)|\approx|\nabla L(w)\Delta w| \quad \text{Equation 2.}$$

Using a power of two in place of the absolute value operator, the weight importance can further be defined by Equation 3 below.

$$\text{Weight Importance}:=(\nabla L(w))^2 \quad \text{Equation 3.}$$

The scoring component 106 can compute the weight importance using Equation 3 for each filter in each layer using a single pass through the training dataset. During this pass, the model weights are not updated, allowing GS to ignore the order in which data is presented. The scoring component 106 further computes the sum of the weight importance per filter to generate their corresponding importance scores. In this regard, the importance scores for each filter correspond to an aggregate of their weight importance for each data point in the training dataset 102.

In some embodiments, the ranking component can 112 can rank the filters within each layer relative to one another based on their aggregate importance scores, with the low scoring filters being candidates for pruning by the pruning component 108. In this regard, the pruning component 108 can remove a subset of the filters (wherein the subset can include 1 or more filters) from one or more layers of the NN model 118 based on the importance scores associated with the subset failing to satisfy a minimum threshold importance score value. In various embodiments, the pruning component 108 can bypass pruning any filters from the first input layer and the last output layer of the NN model 118, regardless of their importance score values. The compression component 110 then converts the NN model into the compressed NN model 120 with the subset of the filters removed. In some implementations, this can involve removing entire layers from the NN model 118 when all of the filters in the layer receive importance score values that are less than the minimum threshold importance score value.

In some embodiments, the minimum threshold importance score value can be predefined. In other embodiments described below, the thresholding component 116 can determine the minimum threshold importance score value. Additionally, or alternatively, the pruning component 108 can apply different threshold importance score values and generate multiple compressed versions of the NN model 118 at different compression rates, wherein the higher the compression rate, the higher the threshold importance score value. With these embodiments, the different compression rates can reflect the percentage of filters removed, wherein the higher the compression rate, the greater number of filters removed.

FIG. 2 presents an example algorithm (Algorithm 1) for calculating the filter importance scores in greater detail. In various embodiments, the scoring component 106 can employ Algorithm 1 to calculate the filter importance scores.

With reference again to FIG. 1, in some embodiments, the GS method can be applied to prune BN and PReLu layers from the NN model 118. BN layers have a one-to-one correspondence with their preceding convolution layers. Thus, in some embodiments, the pruning component 108 can be configured to retain only those BN filters which correspond to filters retained within their preceding convolution layers. The pruning component 108 can apply the same approach to prune PReLU layers as well, by to retaining only those PReLu filters which correspond to filters retained within their preceding convolution layers.

In some embodiments, the NN model 118 can include residual connections. Unlike standard neural connections, residual connections share properties across multiple layers. In some implementations of these embodiments, the pruning component 118 can apply an exception or alternative rule for removing the residual connection filters regardless of whether their importance scores satisfy or fail to satisfy the threshold importance score value. In this regard, a residual connection filter refers to a filter in one layer with a residual connection to another filter in a different layer. This exception or alternative rule for removing filters with residual connections with other filters in other layers can take into consideration the incoming and outgoing residual links.

In some embodiments, the pruning component 118 can apply order-agnostic pruning in association with removing residual connection filters. In order-agnostic pruning, the pruning component 118 can ensure that the fan-out number from each residual connection layer being summed is the same without maintain the specific ordering of the filters. For example, in the ResNet-18 architecture, the layers "Conv201" and "Conv2_1×1" are joined via residual connections. Suppose after pruning the retained filter indices are {0, 2, 3, 4, 5} for "Conv201" and "Conv2_1×1" for {1, 2, 3, 4, 5}. With order-agnostic pruning the pruning component 118 can ignore the fact that the indices to not match as long as the sum of the filters in each layer is the same.

In some implementations of the embodiments, the pruning component 118 can add one or more low ranking filters from the layer with fewer filters to match the number of corresponding filters retained in the corresponding residual connection layer. For example, assuming a first residual connection layer included 5 filters with importance score values exceeding the threshold value and the corresponding second residual connection filter included only 4, the pruning component 118 can retain the next highest-ranking filter in the second residual connection layer, despite it having an importance score value less than the threshold layer, resulting in both layers including a total of 5 filters. In other implementations, the pruning component 118 can remove filters from the layer with the greater number of filters. For example, assuming a first residual connection layer included 5 filters with importance score values exceeding the threshold value and the corresponding second residual connection filter included only 4, the pruning component 118 can remove the lowest ranking filter from the first layer, resulting in both layers having a total of 4 filters.

Alternatively, the pruning component 118 can apply order-preserving pruning in association with removing residual connection filters. In order-preserving pruning, the pruning component 118 instead performs a union of the filter indices and retains all of the necessary filters in both layers. In this regard, in accordance with the example filter indices above for "Conv201" and Conv2_1×1", the pruning component would retain filters {0, 1, 2, 3, 4, 5} for both layers. Although this approach can result in retaining more filters than the order-agnostic pruning, the compressed model performance is typically improved compared with the agnostic solution.

In some embodiments, the thresholding component 116 can determine or facilitate determining the threshold importance score value used by the pruning component 108 for removing filters. In this regard, armed with a knowledge of which filters are most important within each layer, the thresholding component 116 can determine or facilitate determining how many filters ought to be removed from the NN model 118. To answer this question, the sorting component 114 can start by normalizing the importance scores of the filters within a layer, resulting in normalized importance scores for the filters within the layer, resulting in normalized importance scores for the filters within the layer. The sorting component 114 (and/or the ranking component 114) can further order or rank the normalized importance scores withing the layer and determine a cumulative sum of the normalized importance scores for the layer. In some implementations, the sorting component 114 can also sort the layers as a function of the cumulative sums associated with each layer.

The thresholding component 116 can further determine the threshold importance score value based on a measure of contribution of the normalized importance scores to the cumulative sums associated with each layer. For example, in some embodiments, the thresholding component 116 can set a filter importance threshold such that all filters which cumulatively yield less than or equal to the threshold value are removed. In this regard, in many implementations, the vast majority of filters contribute only small amounts to the cumulative sum. This is especially true of layers with high filter counts. Thus, setting similar thresholds across all layers automatically removes more filters from filter-heavy layers. To achieve higher compression, the thresholding component 116 can choose a higher threshold value, and vice versa. The thresholding component 116 can also determine the threshold importance score values such that the resulting compressed NN model 120 includes layers with similar parameter counts but with different parameter distributions across the layers, which have been found to achieve similar final performance as their uncompressed counterpart (e.g., NN model 118). The thresholding component 116 can thus assume that it is more important to correctly rank filters than to precisely tune the drop thresholds for each layer. One exception is that the initial input layer and the final output layer should not be given aggressive thresholds. In this regard, the thresholding component 116 can apply lower threshold importance score values for the initial input layer and the final output layer relative to the middle layers.

In some embodiments, once the compressed NN model 120 has been generated the compressed NN model 120 can be stored in memory 126 (or another memory) and, the inferencing component 136 can apply the compressed NN model 120 (e.g., using inferencing component 136) to one or more new data samples 138 to generate an inference output 140. The compressed NN model 120 model has a smaller memory footprint and higher inferencing speed relative to the NN model 118 with similar performance accuracy.

In this regard, the compressed NN model 120 can use a significantly smaller amount of the memory 126 (or another memory) relative to the NN model 118, which can vary based on the compression rate. For example, in some embodiments, the compressed NN model 120 can use at least 30% less of the memory 126 relative to the NN model 118. In other embodiments, the compressed NN model 120 can use at least 40% less of the memory 126 relative to the NN model 118. In other embodiments, the compressed NN model 120 can use at least 50% less of the memory 126 relative to the NN model 118. In other embodiments, the compressed NN model 120 can use at least 60% less of the memory 126 relative to the NN model 118. Still in other embodiments, the compressed NN model 120 can use at least 70% less of the memory 126 relative to the NN model 118.

In some embodiments, the inferencing speed (or processing time used by the inferencing component 136 to generate the inference output 140 based on application of the compressed NN model 120 to a new data sample) can be at least 30% faster relative to the inferencing speed of the NN model 118. In other embodiments, the inferencing speed of the compressed NN model 120 can be at least 40% faster relative to the inferencing speed of the NN model 118. In other embodiments, the inferencing speed of the compressed NN model 120 can be at least 50% faster relative to the inferencing speed of the NN model 118. In other embodiments, the inferencing speed of the compressed NN model 120 can be at least 60% faster relative to the inferencing speed of the NN model 118. Still, in other embodiments, the inferencing speed of the compressed NN model 120 can be at least 70% faster relative to the inferencing speed of the NN model 118.

Furthermore, in some embodiments, the compressed NN model 120 has less than or equal to a 40% performance accuracy degradation relative to the NN model 118. In other embodiments, the compressed NN model 120 has less than or equal to a 30% performance accuracy degradation relative to the NN model 118. In other embodiments, the compressed NN model 120 has less than or equal to a 20% performance accuracy degradation relative to the NN model 118. In other embodiments, the compressed NN model 120 has less than or equal to a 15% performance accuracy degradation relative to the NN model 118. Still in other embodiments, the compressed NN model 120 has less than or equal to a 10% performance accuracy degradation relative to the NN model 118.

Additionally, or alternatively, the optimization module 128 can retrain and fine-tune (e.g., using fine tuning component 130) the compressed NN model 120 using the training dataset 102 to generate optimized compressed NN model 132. The inferencing component 136 can further apply the optimized compressed NN model 132 to the new data samples 138 to generate the inference output 140. This fine-tuning process can involve adjusting or fine-tuning one or more weights and/or parameter values of the filters of the compressed NN model 120 using the training dataset 102 until convergence is achieved. This fine-tuning process can include a supervised, semi-supervised, and/or unsupervised machine learning process. In various embodiments, the fine-tuning component 130 can retain the parameter values of the remaining filters included in the compressed NN model 120 as opposed to re-initializing their parameters, which has been found to markedly slows down convergence during fine-tuning.

In various embodiments, the optimized compressed NN model 132 and the compressed NN model 120 can have same or similar memory footprints and inferencing speeds. However, the performance accuracy of the optimized compressed NN model 132 can be higher than that of the compressed NN model 120. In some embodiments, this fine-tuning process can be skipped in implementations in which the performance accuracy of the compressed NN model 120 is acceptable for the inferencing task and model usage context.

FIG. 3 illustrates a flow-diagram of an example, non-limiting method 300 for compressing DNNs based on filter importance in accordance with one or more embodiments of the disclosed subject matter. Method 300 provides an end-to-end illustration of the GS method including the fine-tuning element. Repetitive description of like elements employed in respective embodiments is omitted for sake of brevity.

Method 300 starts with a previously trained NN model (e.g., NN model 118) with layers that have been trained on the training dataset 102 until convergence was achieved. In accordance with method 300, at 302 the training dataset 102 is passed through the trained layers and the gradient calculations of the weight importance of the filters are generated (e.g., using Algorithm 1). At 304, the filter importance scores for the respective filters in each of the layers are then determined based on the gradient calculations. In this regard, the illustrated slices associated with the corresponding steps in method 300 correspond to one example layer 301 of the NN model 118, wherein the slices correspond to the filters within the layer. However, it should be appreciated that the process for computing importance scores for the filters within the layers of the NN model 118 is done in a single pass (e.g., the training data 102 is passed through the layers once and the importance scores for all the filters in all of the layers are computed during the single pass). In this regard, steps 302-310 of method 300 are performed done for each layer in the NN model 118 simultaneously.

Continuing with method 300, at 306, the filters within each layer are ranked and sorted based on the cumulative importance scores associated therewith, such as from highest to lowest (e.g., via sorting component 114). At 308, a threshold importance score is determined (e.g., via the thresholding component 116) for pruning the filters within each layer. In some embodiments, a single threshold importance score can be determined and applied to all of the layers (e.g., the same threshold importance score is used for all the layers). In other embodiments, at 308, the threshold importance sore for each layer can be independently determined and applied. With these embodiments, the threshold importance score used for each of the layers can vary. At 310, the filters under the threshold importance score are pruned (e.g., removed). For example, as applied to example layer 301, at 310, the filters under the threshold importance score can be removed, resulting in the remaining filters in the layer 303. At 310, compression component can also recombine all of the pruned layers to generate the compressed NN model 120. At 312, the compressed NN model 120 is retrained and fine-tuned using the training dataset until convergence is achieved, resulting in generation of the optimized compressed NN model 132 at 314.

Figure 4:
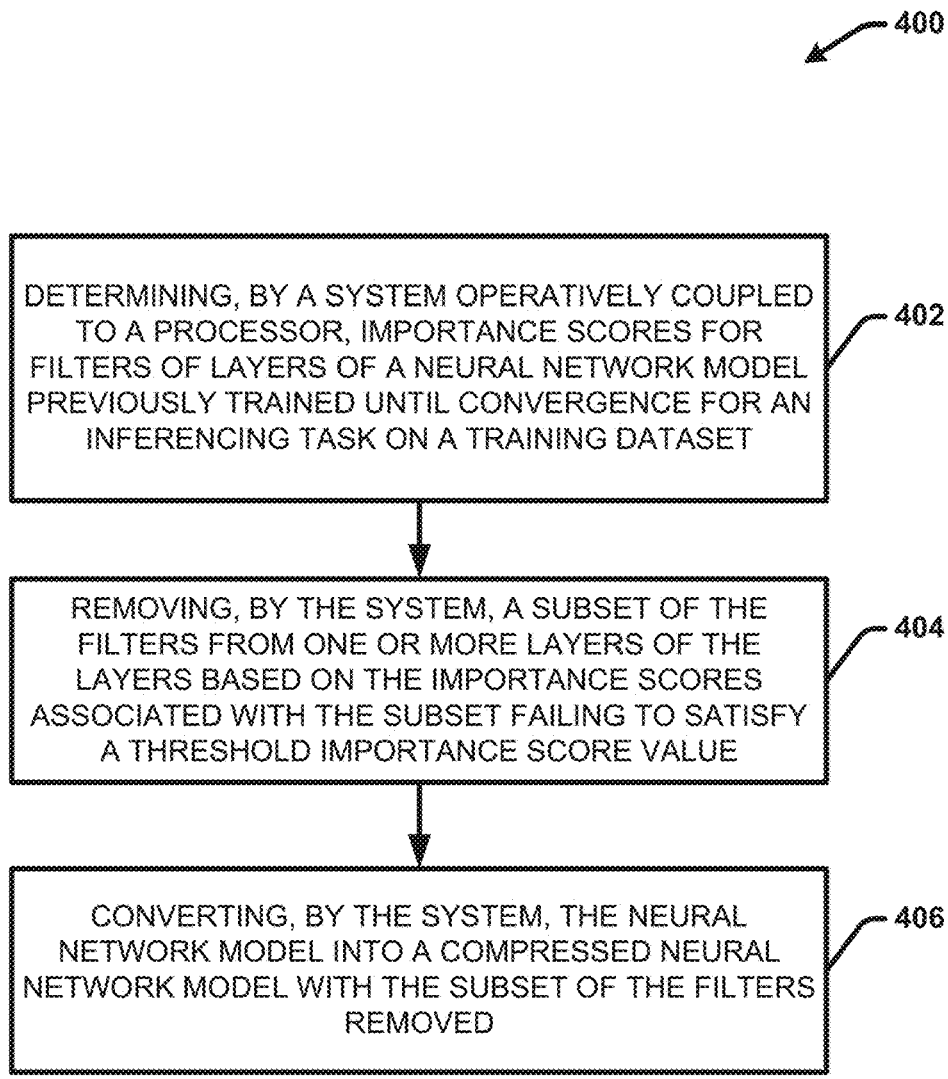
FIG. 4 presents a high-level flow diagram of an example computer-implemented method for compressing DNNs based on filter importance in accordance with one or more embodiments of the disclosed subject matter.

FIG. 4 presents a high-level flow diagram of an example computer-implemented method 400 for compressing DNNs based on filter importance in accordance with one or more embodiments of the disclosed subject matter. Repetitive description of like elements employed in respective embodiments is omitted for sake of brevity.

At 402, method 400 includes determining, by a system operatively coupled to a processor (e.g., system 100), importance scores for filters of layers of a neural network model previously trained until convergence for an inferencing task on a training dataset (e.g., using scoring component 106). At 404, method 400 includes removing, by the system, a subset of the filters from one or more layers of the layers based on the importance scores associated with the subset failing to satisfy a threshold importance score value (e.g., using pruning component 108). At 406, method 400 includes converting, by the system, the neural network model into a compressed neural network model with the subset of the filters removed (e.g., using compression component 110).

Figure 5:
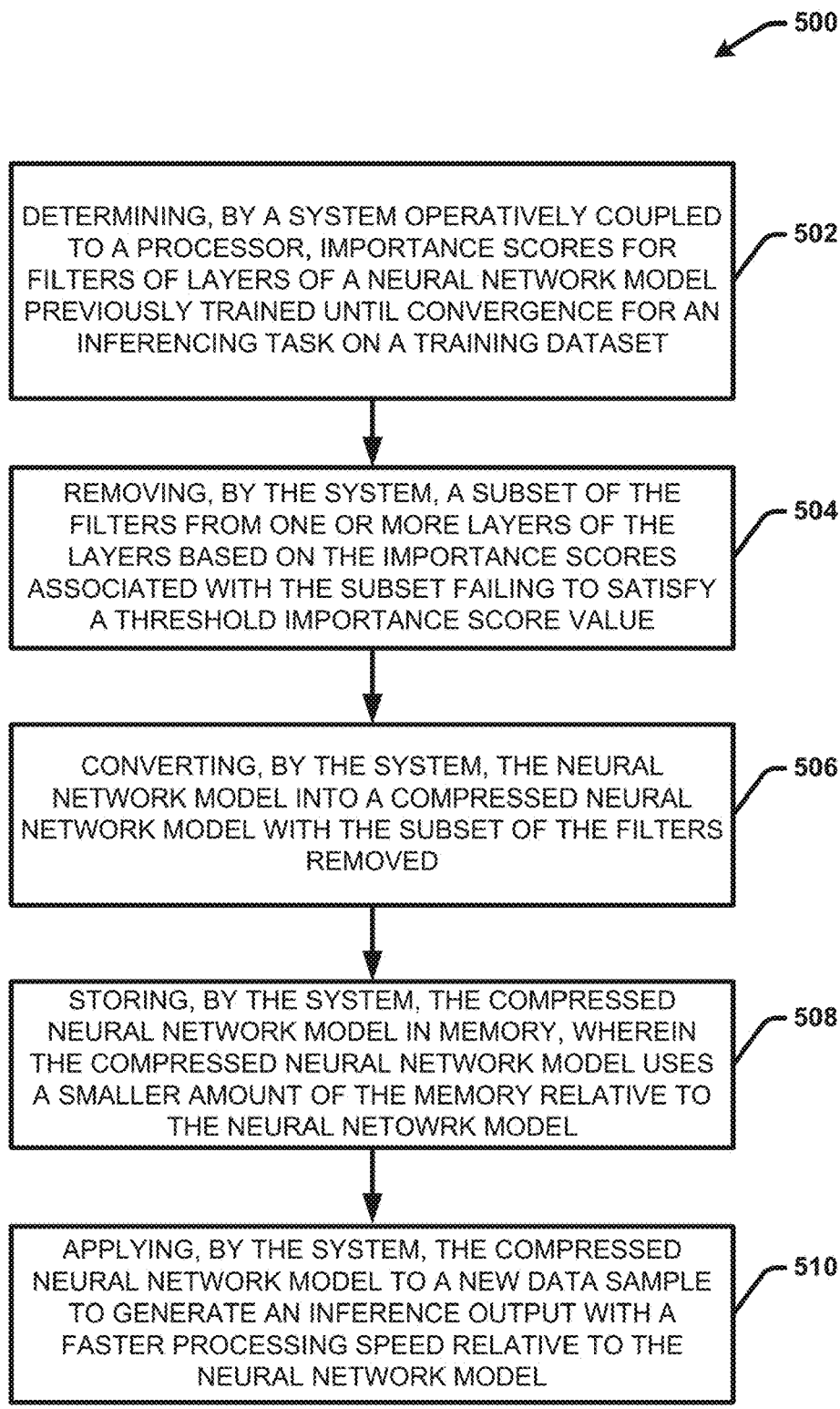
FIG. 5 presents a high-level flow diagram of an example computer-implemented method for generating and applying a DNNs based on filter importance in accordance with one or more embodiments of the disclosed subject matter.

FIG. 5 presents a high-level flow diagram of an example computer-implemented method 500 for generating and applying a DNNs based on filter importance in accordance with one or more embodiments of the disclosed subject matter. Repetitive description of like elements employed in respective embodiments is omitted for sake of brevity.

At 502, method 500 includes determining, by a system operatively coupled to a processor (e.g., system 100), importance scores for filters of layers of a neural network model previously trained until convergence for an inferencing task on a training dataset (e.g., using scoring component 106). At 504, method 500 includes removing, by the system, a subset of the filters from one or more layers of the layers based on the importance scores associated with the subset failing to satisfy a threshold importance score value (e.g., using pruning component 108). At 506, method 500 includes converting, by the system, the neural network model into a compressed neural network model with the subset of the filters removed (e.g., using compression component 110). At 508, method 500 includes storing, by the system the compressed neural network model in memory, wherein the compressed neural network model uses a smaller amount of the memory relative to the neural network model. At 510, method 500 comprises applying, by the system (e.g., using inferencing component 136), the compressed neural network model to a new data sample to generate an inference output with a faster processing speed relative to the neural network model and a similar accuracy level.

Figure 6:
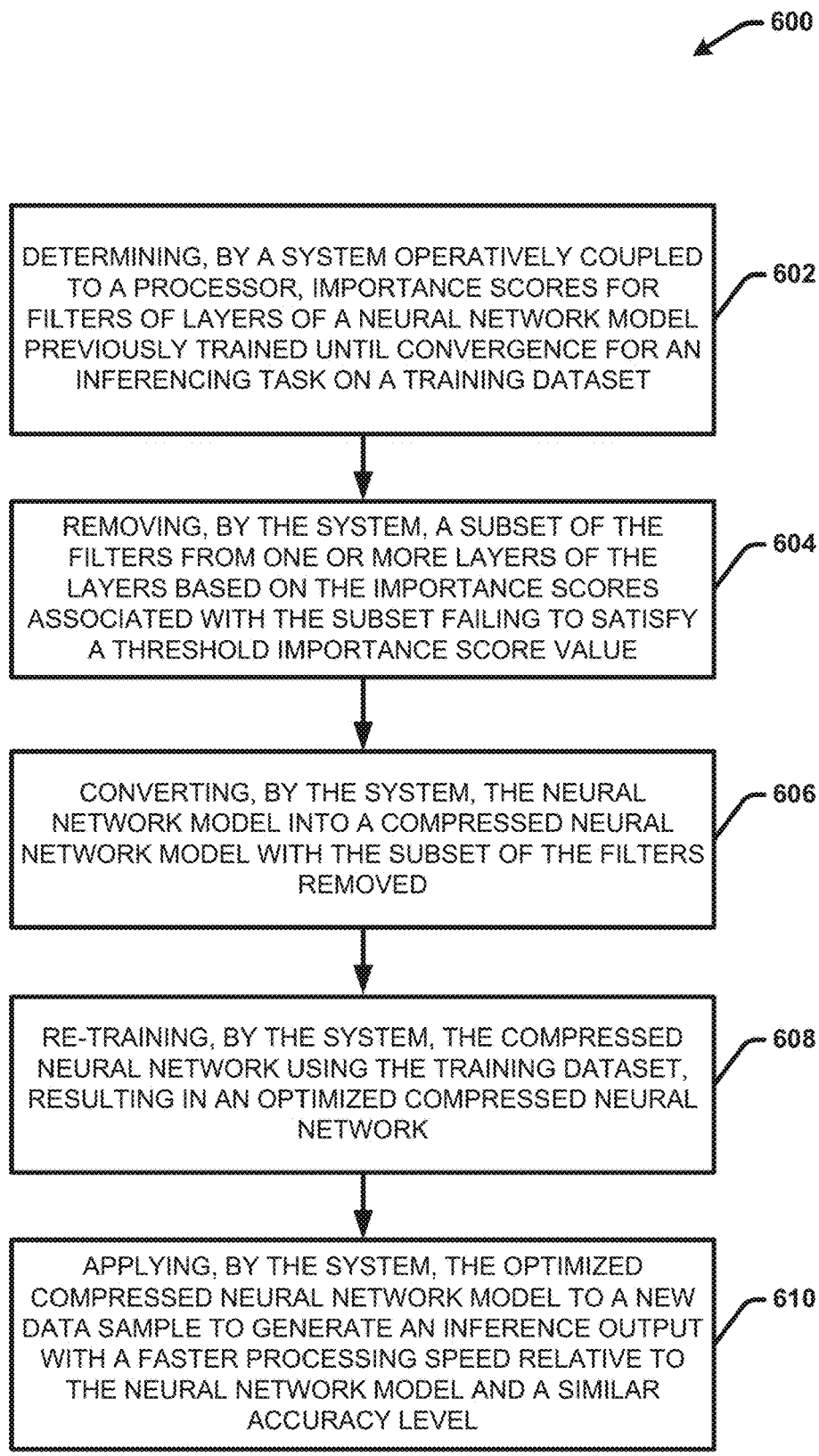
FIG. 6 presents a high-level flow diagram of another example computer-implemented method for generating and applying a DNNs based on filter importance in accordance with one or more embodiments of the disclosed subject matter.

FIG. 6 presents a high-level flow diagram of another example computer-implemented method 600 for generating and applying a DNNs based on filter importance in accordance with one or more embodiments of the disclosed subject matter. Repetitive description of like elements employed in respective embodiments is omitted for sake of brevity.

At 602, method 600 includes determining, by a system operatively coupled to a processor (e.g., system 100), importance scores for filters of layers of a neural network model previously trained until convergence for an inferencing task on a training dataset (e.g., using scoring component 106). At 604, method 600 includes removing, by the system, a subset of the filters from one or more layers of the layers based on the importance scores associated with the subset failing to satisfy a threshold importance score value (e.g., using pruning component 108). At 606, method 500 includes converting, by the system, the neural network model into a compressed neural network model with the subset of the filters removed (e.g., using compression component 110). At 608, method 600 includes re-training, by the system, the compressed neural network model using the training dataset, resulting in an optimized compressed neural network model. At 610, method 600 comprises applying, by the system (e.g., using inferencing component 136), the optimized compressed neural network model to a new data sample to generate an inference output with a faster processing speed relative to the neural network model and a similar accuracy level.

To demonstrate its effectiveness, disclosed GS compression method was tested on both image classification and image segmentation tasks. For both applications, popular CNN architectures were used for the base models and then pruned at various compression rates. For image classification, the disclosed GS pruning method was compared against the existing Look Ahead Pruning (LAP) method. For segmentation, the GS pruning method was compared against random pruning. These experiments and corresponding results are discussed and presented with reference to FIGS. 7-11.

FIG. 7 provides tables comprising experimental data associated with testing efficacy of GS in accordance with the image classification experiments and the image segmentation experiments. Table 701 provides hyper-parameters of the models used for image classification (e.g., VGG19 and ResNet-19) and the model used for image segmentation (e.g., UNet). Table 702 provides a comparison of the VGG10 and ResNet-19 base models for the image classification experiments as pruned using GS and LAP.

For the image classification experiments, the Canadian Institute for Advanced Research 10, (CIFAR-10) was used to train the base models. This data set includes a collection of images that are commonly used to training machine learning and computer vision algorithms. This training dataset consists of 60,000 color images (size 32×32) split evenly across 10 different classes. The training dataset was split into 50,000 images for training and 10,000 images for testing (e.g., in accordance with stand ML development practices). The training dataset was further augmented with different versions of the training images with left-right image flipping, random cutout with size 8×8, and random brightness.

Experiments were performed using base models with both VGG19 and ResNet-18 architectures. In both cases an Adam optimizer was used, though separate learning rate schedules were applied for each network. For the VGG19 model, an exponentially decaying learning rate with a factor of 0.05 every epoch after holding a constant value of 0.004 for 12 initial 'warm-up' epochs was used. For the ResNet-18 model, an initial learning rate of 0.01 reducing by a factor of 0.2 whenever the validation loss plateaued for 5 consecutive epochs was used. In both cases, the minimum learning rate was restricted to be 0.00001. (See Table 701 for other hyper-parameters).

Both base models were trained until convergence. For the VGG19 base model, the final test accuracy was 89.02% and the total number of weight parameters (i.e., filters) was 38,947,914. For the ResNet-18 base model, the test accuracy was 92.70% and the parameter/filter count was 11,183,562.

The base models were then pruned using both GS pruning and LAP at different levels of compression. The performance accuracy of the compressed models generated using the different pruning techniques were further compared. with respect to final test accuracy at different levels of desired network compression. Due to minor implementation differences, the GS base models have different parameter counts, but the topology and kernel sizes of both the GS and LAB implementations are identical.

To verify the generalizability of GS, this novel pruning method was also tested on an image segmentation task using the Montgomery Chest X-ray dataset, which was collected as part of a tuberculosis control program by the Department of Health and Human Services of Montgomery County, MD, USA. This dataset contains 138 posterior-anterior X-rays and corresponding lung segmentation masks for left and right lung fields. Data pre-processing involved resizing the images to 512×512, combining the left and right lung-fields to create a single chest mask which served as the ground truth, and then randomly splitting the images into 103 training samples and 35 testing samples. Left-right image flipping was also used during training for augmentation. The baseline image segmentation model used included a standard 2D U-Net which was trained until convergence using an Adam optimizer with an initial learning rate of 0.0001. The learning rate was halved every time the validation loss plateaued for 10 consecutive epochs. The Dice coefficient was used for evaluating the model as defined in Equation 4, below where A is the predicted mask, B is the ground truth mask, and |A∩B| is the number of pixels common to both.

$$Dice(A, B) = \frac{2|A \cap B|}{|A| + |B|}. \qquad \text{Equation 4}$$

The final test dice coefficient for the trained base U-Net model was 0.96. Because no baseline data in the model pruning literature was found for this dataset, the GS pruning method was compared with a random pruning strategy for the image segmentation modeling task. This random pruning method involved dropped filters randomly in order to obtain a model with the same final parameter count and topology as was achieved through GS.

Figure 8:
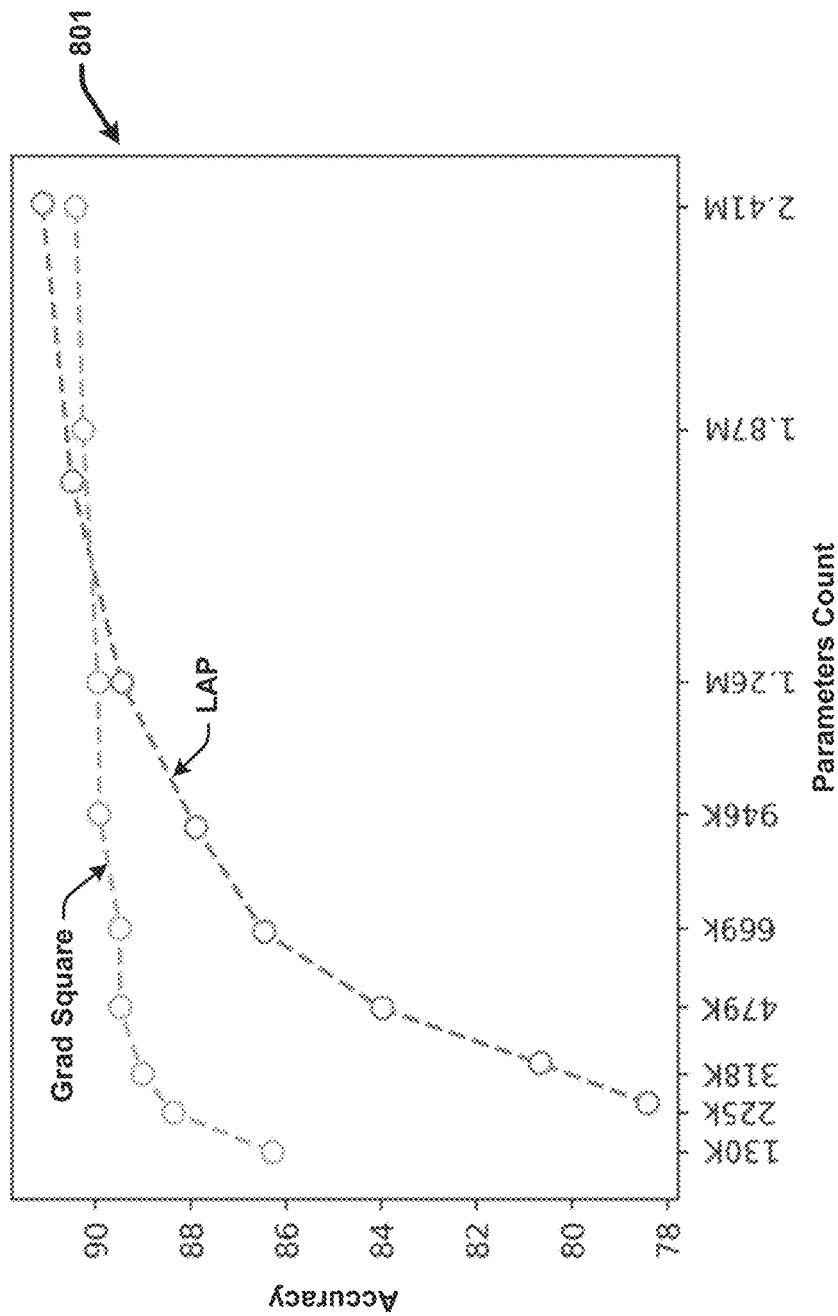
FIG. 8 provides experimental results data demonstrating efficacy of the disclosed pruning methods in association with compression of a DNN having a VGG19 (visual geometry group) architecture.

FIG. 8 provides experimental results data demonstrating efficacy of the disclosed GS pruning method in association with compression of the VGG19 image classification model. For this experiment, the VGG19 model was compressed at different compression rates using GS and LAP for comparison. The inferencing accuracy of the different models was then tested on the CIFAR-10 dataset. The inferencing speeds of the compressed models on a standard machine with an Intel® Xeon® E5 CPU and 64 G of RAM was further tested and compared.

Table 802 shows the results of pruning VGG19 using LAP and GS at various compression rates. The first row of Table 802 shows the total parameters in the model, and the second row shows the corresponding final test accuracy for each of the pruning methods. The third row in the GS section of Table 802 is the measured inference time in milliseconds (ms) for inferencing on a single sample. The Inference time was measured by running 100 sets of 10K inferences and selecting the minimum average time amongst the sets. The parameter count of the model pruned with GS was maintained to be close to that of LAP, but note that an exact match in parameter count was not achieved. The primary reason for this is that LAP performs unstructured pruning, which gives it much finer control over the final parameter count compared with the GS filter thresholding.

The results of this experiments are also visualized in Graph 801. In this regard, Graph 801 compares the final accuracies after pruning and retraining at different compression rates for VGG19 on CIFAR-10. From Graph 801 we can see that the performance of GS overshadows that of LAP at higher compression rates (left side of the Graph 801), while still performing similarly at lower compression rates. Note that GS also results in models which provide real-world inferencing speed acceleration, in contrast to mask-based pruning methods like LAP where the number of floating point operations remains the same.

Figure 9:
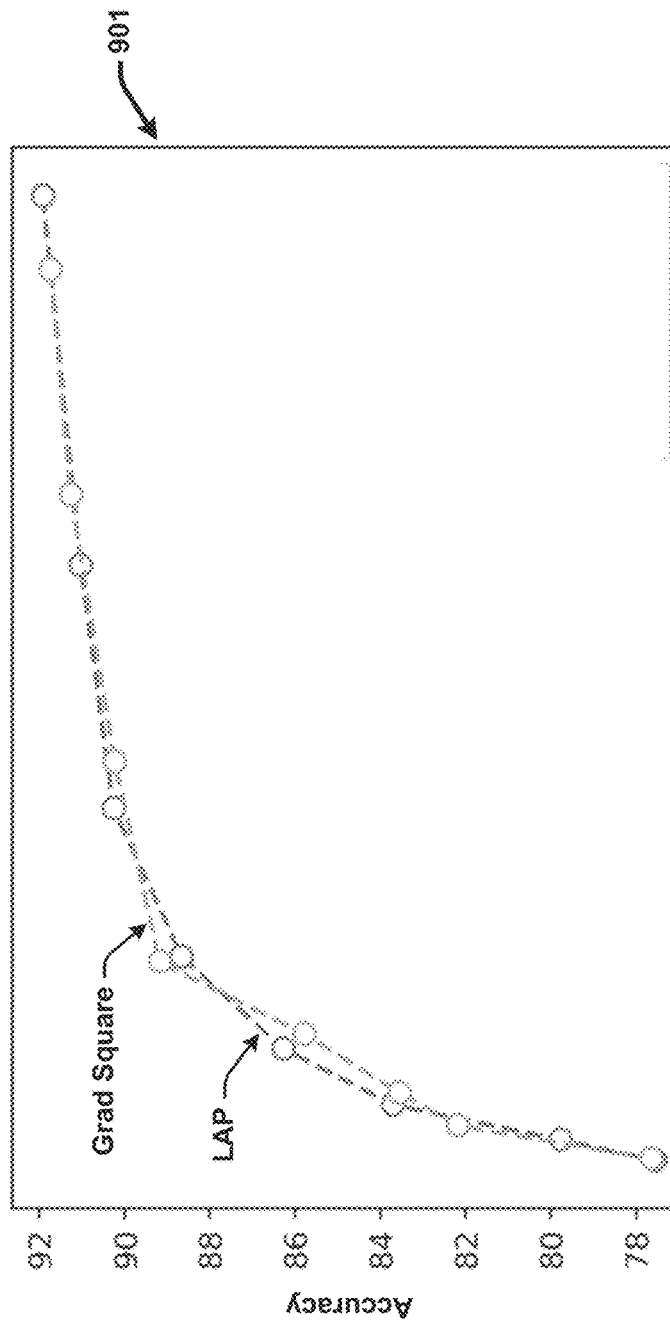
FIG. 9 provides experimental results data demonstrating efficacy of the disclosed pruning methods in association with compression of a DNN having a ResNet-18 architecture.

FIG. 9 provides experimental results data demonstrating efficacy of the disclosed GS pruning method in association with compression of the ResNet-18 image classification model. For this experiment, the ResNet-18 model was compressed at different compression rates using GS and LAP for comparison. The inferencing accuracy of the different models was then tested on the CIFAR-10 dataset. The inferencing speeds of the compressed models on a standard machine with an Intel® Xeon® E5 CPU and 64 G of RAM was further tested and compared. Table 902 and Chart 901 receptively summarize the results. From Chart 901, we can see that GS produces pruned models that are comparable to LAP in terms of final test accuracy. Although we do not get the same improvement over LAP as was seen with VGG19, we can still observe a significant improvement in terms of inference speed.

Figure 10:
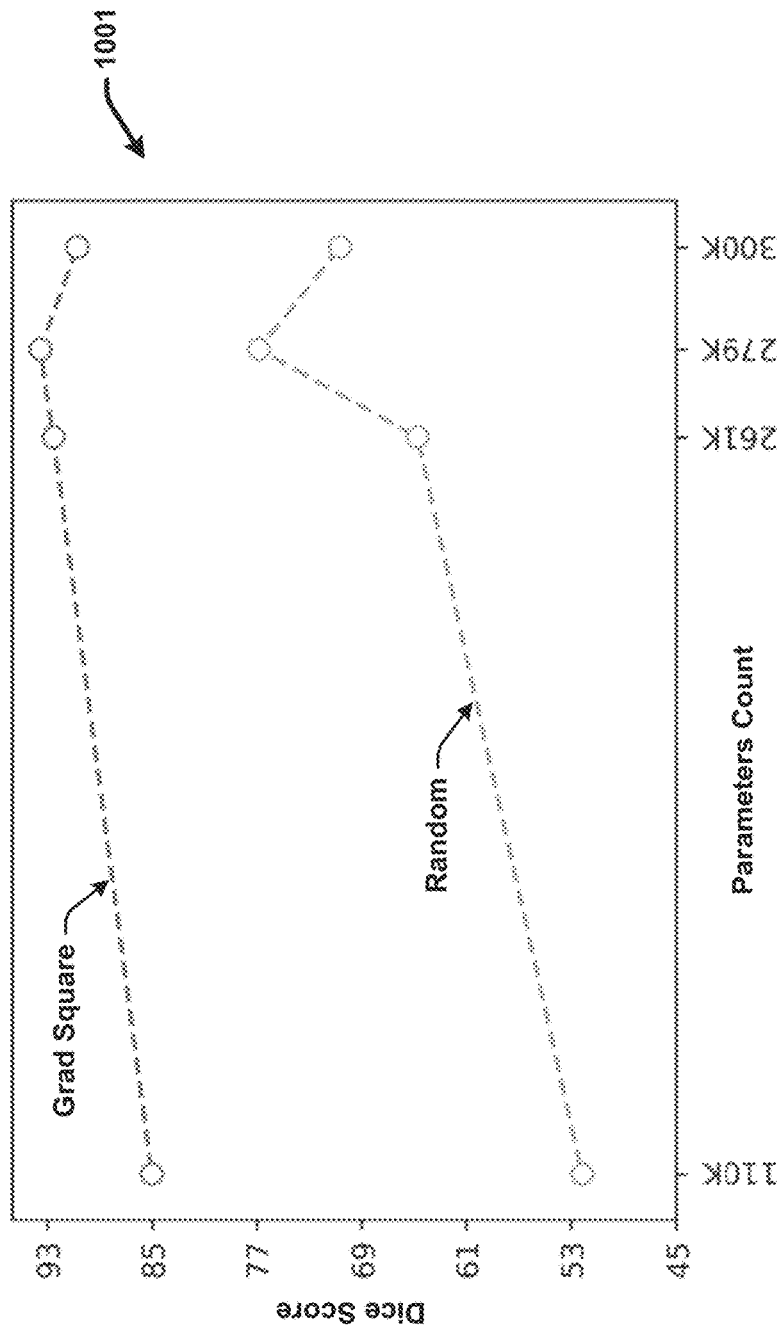
FIG. 10 provides experimental results data demonstrating efficacy of the disclosed pruning methods in association with compression of a DNN having a two-dimensional (2D) U-Net architecture.
Figure 11:
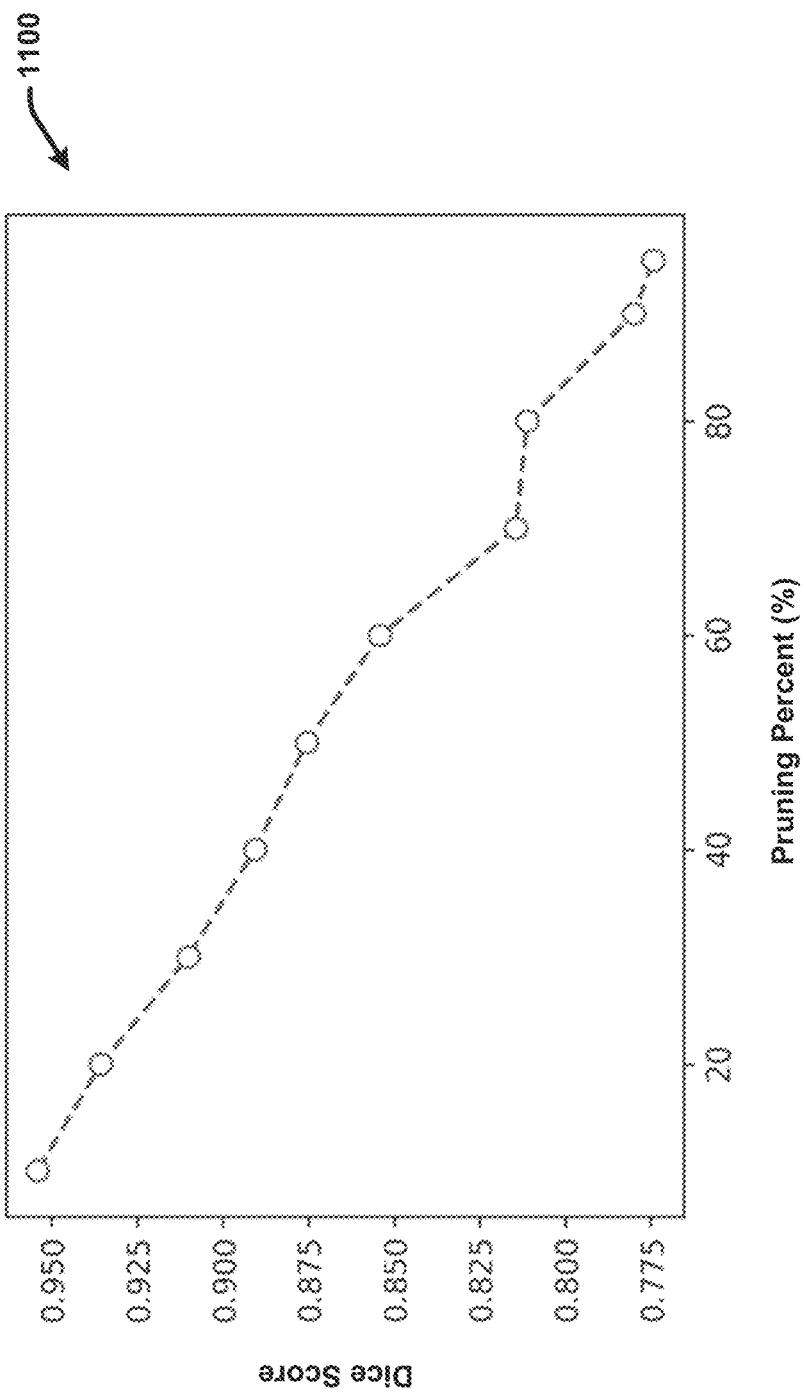
FIG. 11 provides a graph demonstrating changes in accuracy of the disclosed pruning methods in association with compression of the 2D U-Net DNN at different compression rates.

FIGS. 10-11 provide experimental results data demonstrating efficacy of the disclosed GS pruning method in association with compression of the 2D U-Net model for lung field segmentation. For this experiment, the 2D U-net model was compressed at different compression rates using GS and random pruning for comparison. The inferencing accuracy of the different models was then tested on the Montgomery XCR dataset and compared. Table 1002, Chart 1001, and Chart 1100 receptively summarize the results.

As shown in Table 1002, these results support an assumed hypothesis that it more important to determine how to rank the filters than it is to decide how many filters need to be dropped from each layer in accordance with the GS method. Chart 1001 plots the accuracy of accuracy of the UNet model at different compression rates before retraining. As Chart FIG. 1001 illustrates, the GS technique is much more effective than random filter selection. It is also worth noting that the random procedure has a dramatically higher standard deviation as compared with the GS method, indicating that it is not a reliable way to achieve model compression.

Chart 1100 shows the dice coefficient scores of the UNet model pruned at different compression rates using GS and before fine-tuning. As shown in Chart 1100, we can see that even after removing a significant portion of the filters, the GS pruned models manage to hold on to the original test dice scores quite well. Note that the parameter count of the base model was about 31 million, and with GS we managed to reduce it to only 110,000, a significant rate of about a 280 times reduction. The GS pruning improvement over random pruning is statistically significant, with a p-value less than 0.0001 from the paired Wilcoxon Rank Sum test.

In conclusion, the disclosed GS compression technique provides a systematic and simple method for filter pruning which can be used to achieve high compression ratios while preserving model performance. The GS method requires no or minimal manual tuning and boosts inference speed as compared to other compression techniques which mask or zero-out network weights. In addition, the GS method has verifiably demonstrated effective in compressing both image classification and image segmentation models without performance degradation.

Our studies indicate that prioritizing pruning from the parameter-heavy layers (i.e., evening out parameters across layers), grants good results. This prevents the formation of a bottleneck where information flow is hindered due to lower parameter count as compared to other layers in the network. This becomes increasingly important at high compression ratios.

As state-of-the-art models continue to grow larger and larger, there will be an ever-increasing need for effective model compression techniques. The disclosed GS methodology is thus significantly beneficial to the neural network model community at large. In addition, the GS method provides significant improvements over existing compression techniques by generating compressed models with higher inference speeds without the need for specialized hardware or software. This is especially important since competing methodologies like LAP, LTH, and GSM produce models which have no practical benefits given common hardware and software constraints.

It should be noted that, for simplicity of explanation, in some circumstances the computer-implemented methodologies are depicted and described herein as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Figure 12:
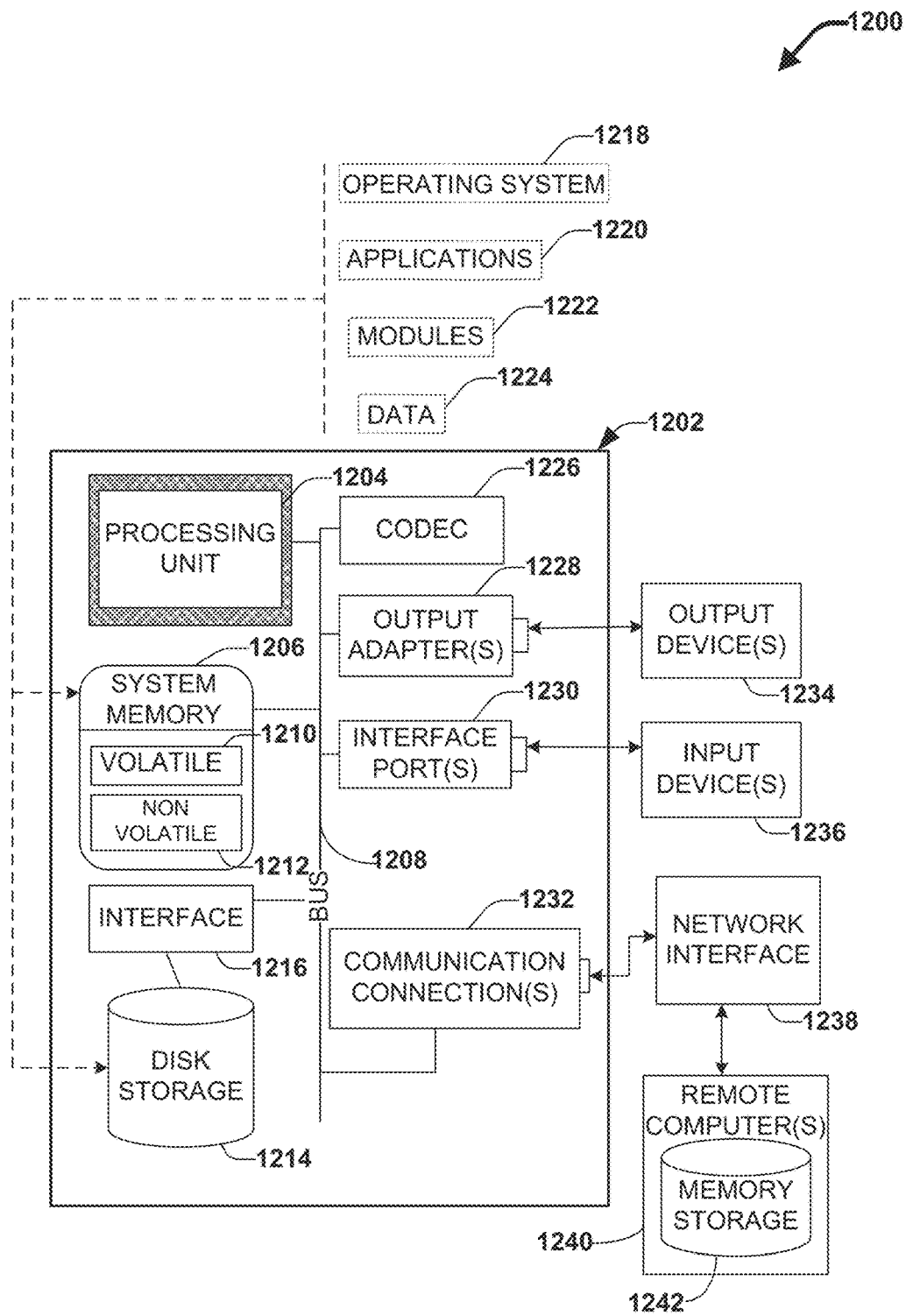
FIG. 12 illustrates a block diagram of an example, non-limiting operating environment in which one or more embodiments described herein can be facilitated.

FIG. 12 can provide a non-limiting context for the various aspects of the disclosed subject matter, intended to provide a general description of a suitable environment in which the various aspects of the disclosed subject matter can be implemented. FIG. 12 illustrates a block diagram of an example, non-limiting operating environment in which one or more embodiments described herein can be facilitated. Repetitive description of like elements employed in other embodiments described herein is omitted for sake of brevity.

With reference to FIG. 12, a suitable operating environment 1200 for implementing various aspects of this disclosure can also include a computer 1202. The computer 1202 can also include a processing unit 1204, a system memory 1206, and a system bus 1208. The system bus 1208 couples system components including, but not limited to, the system memory 1206 to the processing unit 1204. The processing unit 1204 can be any of various available processors. Dual microprocessors and other multiprocessor architectures also can be employed as the processing unit 1204. The system bus 1208 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MCA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1224), and Small Computer Systems Interface (SCSI).

The system memory 1206 can also include volatile memory 1210 and nonvolatile memory 1212. The basic input/output system (BIOS), containing the basic routines to transfer information between elements within the computer 1202, such as during start-up, is stored in nonvolatile memory 1212. Computer 1202 can also include removable/non-removable, volatile/non-volatile computer storage media. FIG. 12 illustrates, for example, a disk storage 1214. Disk storage 1214 can also include, but is not limited to, devices like a magnetic disk drive, floppy disk drive, tape drive, Jaz drive, Zip drive, LS-100 drive, flash memory card, or memory stick. The disk storage 1214 also can include storage media separately or in combination with other storage media. To facilitate connection of the disk storage 1214 to the system bus 1208, a removable or non-removable interface is typically used, such as interface 1216. FIG. 12 also depicts software that acts as an intermediary between users and the basic computer resources described in the suitable operating environment 1200. Such software can also include, for example, an operating system 1218. Operating system 1218, which can be stored on disk storage 1214, acts to control and allocate resources of the computer 1202.

System applications 1220 take advantage of the management of resources by operating system 1218 through program modules 1222 and program data 1224, e.g., stored either in system memory 1206 or on disk storage 1214. It is to be appreciated that this disclosure can be implemented with various operating systems or combinations of operating systems. A user enters commands or information into the computer 1202 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1204 through the system bus 1208 via interface port(s) 1230. Interface port(s) 1230 include, for example, a serial port, a parallel port, a game port, and a universal serial bus (USB). Output device(s) 1234 use some of the same type of ports as input device(s) 1236. Thus, for example, a USB port can be used to provide input to computer 1202, and to output information from computer 1202 to an output device 1234. Output adapter 1228 is provided to illustrate that there are some output devices 1234 like monitors, speakers, and printers, among other output devices 1234, which require special adapters. The output adapters 1228 include, by way of illustration and not limitation, video and sound cards that provide a means of connection between the output device 1234 and the system bus 1208. It should be noted that other devices and/or systems of devices provide both input and output capabilities such as remote computer(s) 1240.

Computer 1202 can operate in a networked environment using logical connections to one or more remote computers, such as remote computer(s) 124. The remote computer(s) 1240 can be a computer, a server, a router, a network PC, a workstation, a microprocessor based appliance, a peer device or other common network node and the like, and typically can also include many or all of the elements described relative to computer 1202. For purposes of brevity, only a memory storage device 1242 is illustrated with remote computer(s) 1240. Remote computer(s) 1240 is logically connected to computer 1202 through a network interface 1238 and then physically connected via communication connection 1232. Network interface 1238 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1232 refers to the hardware/software employed to connect the network interface 1238 to the system bus 1208. While communication connection 1232 is shown for illustrative clarity inside computer 1202, it can also be external to computer 1202. The hardware/software for connection to the network interface 1238 can also include, for exemplary purposes only, internal and external technologies such as, modems including regular telephone grade modems, cable modems and DSL modems, ISDN adapters, and Ethernet cards.

One or more embodiments described herein can be a system, a method, an apparatus and/or a computer program product at any possible technical detail level of integration. The computer program product can include a computer readable storage medium (or media) having computer readable program instructions thereon for causing a processor to carry out aspects of one or more embodiment. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. In this regard, in various embodiments, a computer readable storage medium as used herein can include non-transitory and tangible computer readable storage mediums.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of one or more embodiments can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of one or more embodiments.

Aspects of one or more embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and other devices to function in a particular manner, such that the computer readable storage medium having instructions stored therein comprises an article of manufacture including instructions which implement aspects of the function/act specified in the flowchart and block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and block diagram block or blocks.

The flowchart and block diagrams in the Figures illustrate the architecture, functionality, and operation of possible implementations of systems, methods, and computer program products according to various embodiments described herein. In this regard, each block in the flowchart or block diagrams can represent a module, segment, or portion of instructions, which comprises one or more executable instructions for implementing the specified logical function (s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and flowchart illustration, and combinations of blocks in the block diagrams and flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on one or more computers, those skilled in the art will recognize that this disclosure also can or can be implemented in combination with other program modules. Generally, program modules include routines, programs, components, data structures, etc. that perform particular tasks or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices. For example, in one or more embodiments, computer executable components can be executed from memory that can include or be comprised of one or more distributed memory units. As used herein, the term "memory" and "memory unit" are interchangeable. Further, one or more embodiments described herein can execute code of the computer executable components in a distributed manner, e.g., multiple processors combining or working cooperatively to execute code from one or more distributed memory units. As used herein, the term "memory" can encompass a single memory or memory unit at one location or multiple memories or memory units at one or more locations.

As used in this application, the terms "component," "system," "platform," "interface," and the like, can refer to and can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and a computer. By way of illustration, both an application running on a server and the server can be a component. One or more components can reside within a process or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that can provide specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

The term "facilitate" as used herein is in the context of a system, device or component "facilitating" one or more actions or operations, in respect of the nature of complex computing environments in which multiple components and/or multiple devices can be involved in some computing operations. Non-limiting examples of actions that may or may not involve multiple components and/or multiple devices comprise transmitting or receiving data, establishing a connection between devices, determining intermediate results toward obtaining a result (e.g., including employing ML and/or AI techniques to determine the intermediate results), etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to: sensors, antennae, audio and/or visual output devices, other devices, etc.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches, and gates, in order to optimize space usage or enhance performance of user equipment. A processor can also be implemented as a combination of computing processing units. In this disclosure, terms such as "store," "storage," "data store," "data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or non-volatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
   a memory; and
   a processor that executes computer executable instructions stored in the memory to perform operations comprising:
      training, using a training dataset, until a defined convergence criterion is satisfied, a neural network to perform a medical image inferencing task associated with medical images of patients, wherein the medical image inferencing task comprises modifications to the medical images;
      determining a baseline score for a performance metric for the neural network based on the training;
      determining a threshold importance criterion based on a defined criterion with respect to the baseline score for the performance metric;
      compressing the neural network into a compressed neural network that employs less computing hardware resources for execution than the neural network while satisfying the defined criterion with respect to the baseline score for the performance metric,
   wherein the compressing comprises:
      determining, based on a single forward pass of the training dataset through the neural network, respective importance scores for filters of layers of the neural network with respect to the performance metric, wherein the determining the respective importance scores for the filters comprises, for each filter:
         determining respective weight scores for the filter to each data point of the training dataset, and
         determining the importance score for the filter based on an aggregation of the respective weight scores for the filter to the data points of the training dataset;
      removing a subset of the filters from the layers of the neural network having respective importance scores that satisfy the threshold importance criterion, resulting in the compressed neural network, wherein the layers of the neural network comprise an input layer, at least one convolution layer, and an output layer, and wherein the threshold importance criterion comprises:
         a first threshold importance score for determining whether to remove one or more first filters of at least one of the input layer or the output layer, and
         a second threshold importance score employed for determining whether to remove one or more second filters of the at least one convolution layer, wherein the first threshold importance score is lower than the second threshold importance score; and
      training, using the training dataset, until the defined convergence criterion is satisfied, the compressed neural network to perform the medical image inferencing task; and
   performing, using the compressed neural network, the medical image inferencing task with a new dataset to generate a medical inference output.

2. The system of claim 1, wherein the determining the respective importance scores for the filters further comprises employing a gradient-based scoring mechanism.

3. The system of claim 1, wherein the determining the respective weight score for the filter to each data point of the training dataset comprises determining sensitivity gradients of weights of the filter without changing the weights of the filter.

4. The system of claim 1, wherein the determining the respective importance scores for each of the filters occurs independently without considering their impact on other layers.

5. The system of claim 1, wherein the removing the subset of the filters further comprises ranking the filters within each layer of the layers relative to one another as a function of their importance scores.

6. The system of claim 1, wherein the layers comprise at least one convolutional layer that precedes at least one batch normalization layer, and wherein based on the subset of the filters including a first filter included in the at least one convolutional layer, the removing further removes a second filter included in the at least one batch normalization layer that corresponds to the first filter.

7. The system of claim 1, wherein the filters comprise residual connection filters shared between two or more layers of the layers, and wherein the removing applies an exception for removing the residual connection filters regardless of whether their importance scores fail to satisfy the threshold importance criterion.

8. The system of claim 1, wherein the neural network comprises at least two layers with residual connections between two or more filters of the filters, and wherein the removing maintains the two or more filters regardless of whether their importance scores fail to satisfy the threshold importance criterion.

9. The system of claim 1, wherein the determining the respective importance scores for the filters further comprises:
   normalizing the respective importance scores of the filters within each layer of the layers, resulting in respective normalized importance scores for the filters within each layer,
   determining cumulative sums of the respective normalized importance scores for each layer, and
   sorting the layers as a function of the cumulative sums associated with each layer.

10. The system of claim 9, wherein the determining the threshold importance criterion is further based on a measure of contribution of the respective normalized importance scores to the cumulative sums associated with each layer.

11. The system of claim 1, wherein the compressed neural network has a smaller memory footprint and higher inferencing speed relative to the neural network.

12. The system of claim 1, wherein the compressed neural network has less than or equal to a 15% performance accuracy degradation relative to the neural network.

13. The system of claim 12, wherein the medical image inferencing task further comprises at least one of an image segmentation task or an image classification task.

14. The system of claim 1, wherein first filters having respective importance scores below the first threshold importance score are removed, and wherein second filters having respective importance scores under the second threshold importance score are removed.

15. A method comprising:
training, by a system operatively coupled to a processor, using a training dataset, until a defined convergence criterion is satisfied, a neural network to perform a medical image inferencing task associated with medical images of patients, wherein the medical image inferencing task comprises modifications to the medical images;
determining, by the system, a baseline score for a performance metric for the neural network based on the training;
determining, by the system, a threshold importance criterion based on a defined criterion with respect to the baseline score for the performance metric;
compressing, by the system, the neural network into a compressed neural network that employs less computing hardware resources for execution than the neural network while satisfying the defined criterion with respect to the baseline score for the performance metric, wherein the compressing comprises:
determining, based on a single forward pass of the training dataset through the neural network, respective importance scores for filters of layers of the neural network with respect to the performance metric, wherein the determining the respective importance scores for the filters comprises, for each filter:
determining respective weight scores for the filter to each data point of the training dataset, and
determining the importance score for the filter based on an aggregation of the respective weight scores for the filter to the data points of the training dataset;
removing a subset of the filters from the layers of the neural network having respective importance scores that satisfy the threshold importance criterion, resulting in the compressed neural network, wherein the layers of the neural network comprise an input layer, at least one convolution layer, and an output layer, and wherein the threshold importance criterion comprises:
a first threshold importance score for determining whether to remove one or more first filters of at least one of the input layer or the output layer, and
a second threshold importance score employed for determining whether to remove one or more second filters of the at least one convolution layer, wherein the first threshold importance score is lower than the second threshold importance score; and
training, using the training dataset, until the defined convergence criterion is satisfied, the compressed neural network to perform the medical image inferencing task; and
performing, by the system, using the compressed neural network, the medical image inferencing task with a new dataset to generate a medical inference output.

16. The method of claim 15, wherein the determining the respective importance scores comprises employing a gradient-based scoring mechanism.

17. The method of claim 15, wherein the determining the respective importance scores further comprises determining the respective importance scores each of the filters independently without considering their impact on other layers.

18. The method of claim 15, wherein the removing the subset of the filters further comprises:
ranking the filters within each layer of the layers relative to one another as a function of their importance scores.

19. The method of claim 15, wherein the layers comprise at least one convolutional layer that precedes at least one batch normalization layer, and wherein based on the subset of the filters comprising a first filter included in the at least one convolutional layer, the compressing the neural network further comprises:
removing a second filter included in the at least one batch normalization layer that corresponds to the first filter.

20. The method of claim 15, wherein the filters comprise residual connection filters shared between two or more layers of the layers, and wherein the removing comprises applying an exception for removing the residual connection filters regardless of whether their importance scores fail to satisfy the threshold importance criterion.

21. The method of claim 15, determining the respective importance scores for the filters further comprising:
normalizing the respective importance scores of the filters within each layer of the layers, resulting in respective normalized importance scores for the filters within each layer;
determining cumulative sums of the respective normalized importance scores for each layer; and
sorting the layers as a function of the cumulative sums associated with each layer.

22. The method of claim 21, wherein the determining the threshold importance criterion is further based on a measure of contribution of the respective normalized importance scores to the cumulative sums associated with each layer.

23. The method of claim 15, wherein the medical image inferencing task comprises at least one of an image segmentation task or an image classification task.

24. The method of claim 15, wherein the compressed neural network has a smaller memory footprint and higher inferencing speed relative to the neural network.

25. The method of claim 15, wherein first filters having respective importance scores below the first threshold importance score are removed, and wherein second filters having respective importance scores under the second threshold importance score are removed.

26. A non-transitory machine-readable medium, comprising executable instructions that, when executed by a processor, facilitate performance of operations, comprising:
training, using a training dataset, until a defined convergence criterion is satisfied, a neural network to perform a medical image inferencing task associated with medical images of patients, wherein the medical image inferencing task comprises modifications to the medical images;

determining a baseline score for a performance metric for the neural network model based on the training;

determining a threshold importance criterion based on a defined criterion with respect to the baseline score for the performance metric;

compressing the neural network into a compressed neural network that employs less computing hardware resources for execution than the neural network while satisfying the defined criterion with respect to the baseline score for the performance metric, wherein the compressing comprises:

determining, based on a single forward pass of the training dataset through the neural network, respective importance scores for filters of layers of the neural network with respect to the performance metric, wherein the determining the respective importance scores for the filters comprises, for each filter:

determining respective weight scores for the filter to each data point of the training dataset, and determining the importance score for the filter based on an aggregation of the respective weight scores for the filter to the data points of the training dataset;

removing a subset of the filters from the layers of the neural network having respective importance scores that satisfy the threshold importance criterion, resulting in the compressed neural network, wherein the layers of the neural network comprise an input layer, at least one convolution layer, and an output layer, and wherein the threshold importance criterion comprises:

a first threshold importance score for determining whether to remove one or more first filters of at least one of the input layer or the output layer, and a second threshold importance score employed for determining whether to remove one or more second filters of the at least one convolution layer, wherein the first threshold importance score is lower than the second threshold importance score, training, using the training dataset, until the defined convergence criterion is satisfied, the compressed neural network to perform the medical image inferencing task; and performing, using the compressed neural network, the medical image inferencing task with a new dataset to generate a medical inference output.

27. The non-transitory machine-readable medium of claim 26, wherein the determining the respective weight scores for the filters to each data point of the training dataset comprises determining sensitivity gradients of weights of the filter without changing the weights of the filter.

28. The non-transitory machine-readable medium of claim 26, wherein first filters having respective importance scores below the first threshold importance score are removed, and wherein second filters having respective importance scores under the second threshold importance score are removed.

* * * * *